(12) United States Patent
Cai et al.

(10) Patent No.: US 12,212,762 B2
(45) Date of Patent: Jan. 28, 2025

(54) POINT CLOUD ENCODING METHOD AND APPARATUS, POINT CLOUD DECODING METHOD AND APPARATUS, AND STORAGE MEDIUM

(71) Applicant: HUAWEI TECHNOLOGIES CO., LTD., Guangdong (CN)

(72) Inventors: Kangying Cai, Beijing (CN); Dejun Zhang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 731 days.

(21) Appl. No.: 17/477,812

(22) Filed: Sep. 17, 2021

(65) Prior Publication Data

US 2022/0007037 A1 Jan. 6, 2022

Related U.S. Application Data

(63) Continuation of application No. PCT/CN2020/080140, filed on Mar. 19, 2020.

(30) Foreign Application Priority Data

Mar. 19, 2019 (CN) .......................... 201910210181.3
Mar. 20, 2019 (CN) .......................... 201910214557.8

(51) Int. Cl.
*H04N 19/20* (2014.01)
*H04N 19/136* (2014.01)
(Continued)

(52) U.S. Cl.
CPC ........... *H04N 19/20* (2014.11); *H04N 19/136* (2014.11); *H04N 19/184* (2014.11); *H04N 19/70* (2014.11)

(58) Field of Classification Search
CPC .... H04N 19/20; H04N 19/136; H04N 19/184; H04N 19/70
See application file for complete search history.

(56) References Cited

U.S. PATENT DOCUMENTS

| 2017/0214943 | A1  | 7/2017 | Cohen et al. |
| 2018/0268570 | A1* | 9/2018 | Budagavi ................ G06T 9/001 |

(Continued)

FOREIGN PATENT DOCUMENTS

| CN | 104811722 A | 7/2015 |
| CN | 107517385 A | 12/2017 |

(Continued)

OTHER PUBLICATIONS

Office Action from the Japanese Patent Office for Application No. 2021-556407 dated Feb. 3, 2023, 7 pages.

(Continued)

*Primary Examiner* — David Perlman

(57) ABSTRACT

This application discloses a point cloud encoding method and apparatus, a point cloud decoding method and apparatus, and a storage medium for point cloud encoding and/or decoding, and belongs to a data processing field. The method includes: first obtaining auxiliary information of a to-be-encoded patch, and then encoding the auxiliary information and a first index of the to-be-encoded patch into a bitstream. Values of the first index may be a first value, a second value, and a third value. Different values indicate different types of patches. Therefore, different types of patches can be distinguished by using the first index. For different types of patches, their corresponding auxiliary information encoded into a bitstream may comprise different contents. This can simplify a format of information encoded into the bitstream, reduce bit overheads of the bitstream, and improve encoding efficiency.

24 Claims, 13 Drawing Sheets

(51) Int. Cl.
*H04N 19/184* (2014.01)
*H04N 19/70* (2014.01)

(56) References Cited

U.S. PATENT DOCUMENTS

2019/0087978 A1* 3/2019 Tourapis .................. G06T 3/08
2019/0139266 A1* 5/2019 Budagavi ................. G06T 9/00

FOREIGN PATENT DOCUMENTS

| | | | |
|---|---|---|---|
| CN | 108322742 | A | 7/2018 |
| CN | 108833927 | A | 11/2018 |
| JP | 2022517060 | A | 3/2022 |
| JP | 2022519462 | A | 3/2022 |
| WO | 2019013430 | A1 | 1/2019 |

OTHER PUBLICATIONS

ITU-T H.263 (Jan. 2005), Series H: Audiovisual and Multimedia Systems, Infrastructure of audiovisual services—Coding of moving video, Video coding for low bit rate communication, total 226 pages.
ITU-T H.264 (Apr. 2017), Series H: Audiovisual and Multimedia Systems, Infrastructure of audiovisual services—Coding of moving video, Advanced video coding for generic audiovisual services, total 812 pages.
ITU-T H.265 (Feb. 2018), Series H: Audiovisual and Multimedia Systems, Infrastructure of audiovisual services—Coding of moving video, High efficiency video coding, total 692 pages.
International Search Report and Written Opinion issued in PCT/CN2020/080140, dated Jun. 10, 2020, 10 pages.
Kangying Cai (Huawei) et al: "[VPCC] [New proposal] Patch skipmode syntax proposal", 126. MPEG Meeting; Mar. 25, 2019-Mar. 29, 2019;Geneva; (Motion Picture Expert Group or 1S0/IEC JTC1/SC29/WG11),No. m47472 Mar. 26, 2019 (Mar. 26, 2019), XP030211495,Retrieved from the Internet:URL:http://phenix.int-evry.fr/mpeg/doc_end_user/documents/126_Geneva/wg11/m47472-v4-m47472_SKIP PATCH_HLS_v4.zipm47472_SKIP PATCH_HLS v4/m47472_SKIP PATCH_HLS.docx[retrieved on Mar. 26, 2019].
Tourapis (Apple) A M et al: "Layer/Independent patch identificationand coding", 125. MPEG Meeting; Jan. 14, 2019-Jan. 18, 2019; Marrakech;(Motion Picture Expert Group or ISO/IEC JTC1/SC29/WG11), No. m46585 Jan. 17, 2019 (Jan. 17, 2019), XP030215451,Retrieved from the Internet:URL:http:/phenix.int-evry.fr/mpeg/doc_end_user/documents/125_Marrakech/wg11/m46585-v1 -m46585.zip m46585.docx[retrieved on Jan. 17, 2019].
Anonymous: "Study Text of ISO/IEC CD 23090-5 Video-based PointCloud Compression", 125. MPEG Meeting; Jan. 14, 2019-Jan. 18, 2019; Marrakech; (Motion Picture Expert Group or ISO/IEC JTC1/SC29/WG11), ISO/IEC, CHvol. 23090-5, No. n18180 Feb. 23, 2019 (Feb. 23, 2019), pp. 1-102,XP030212725,Retrieved from the Internet:URL:http://phenix.int-evry.fr/mpeg/doc_end_user/documents/125_Marrakech/wg11/w18180-v2-w18180.zip w18180 - V-PCC - SCD.docx[retrieved on Feb. 23, 2019].
Alexis Tourapis et al: "[V-PCC] [New proposal] Comments on V-PCCCD", 125. MPEG Meeting; Jan. 14, 2019-Jan. 18, 2019; Marrakech;(Motion Picture Expert Group or 1S0/IEC JTC1/SC29/WG11),No. m46198 Jan. 15, 2019 (Jan. 15, 2019), XP030214729,Retrieved from the Internet:URL:http://phenix.int-evry.fr/mpeg/doc_end_user/documents/125_Marrakech/wg11/m46198-v2-m46198_v2.zip m46198_v2.docx[retrieved on Jan. 15, 2019].
European Extended Search Report for Application No. 20774250.3 dated Mar. 30, 2022, 9 pages.
Office Action issued in CN201910214557.8, dated Mar. 16, 2023, 7 pages.

* cited by examiner

POINT CLOUD ENCODING METHOD AND APPARATUS, POINT CLOUD DECODING METHOD AND APPARATUS, AND STORAGE MEDIUM

CROSS-REFERENCE TO RELATED APPLICATIONS

This application is a continuation of International Application No. PCT/CN2020/080140, filed on Mar. 19, 2020, which claims the priority to Chinese Patent Application No. 201910210181.3, filed on Mar. 19, 2019 and Chinese Patent Application No. 201910214557.8, filed on Mar. 20, 2019. All of the aforementioned patent applications are hereby incorporated by reference in their entireties.

TECHNICAL FIELD

This application relates to the field of data processing technologies, and in particular, to a point cloud encoding method and apparatus, a point cloud decoding method and apparatus, and a storage medium for point cloud encoding and/or decoding.

BACKGROUND

With continuous development of three-dimensional sensing technologies, point cloud collection is becoming more convenient, and a collected point cloud has increasingly high quality and is also becoming increasingly large. Therefore, currently how to effectively encode and decode the point cloud becomes an urgent problem to be resolved.

SUMMARY

This application provides a point cloud encoding method and apparatus, a point cloud decoding method and apparatus, and a storage medium, so as to resolve a problem about how to effectively encode and decode a point cloud in a related technology. The technical solutions are as follows.

According to a first aspect, a point cloud encoding method is provided, where the method includes: obtaining auxiliary information of a to-be-encoded patch (point cloud patch); and encoding the auxiliary information of the to-be-encoded patch and a first index of the to-be-encoded patch into a bitstream, where the first index is a first value, indicating that the to-be-encoded patch is a first-type patch, and the auxiliary information of the to-be-encoded patch includes three-dimensional information; or the first index is a second value, indicating that the to-be-encoded patch is a second-type patch, and the auxiliary information of the to-be-encoded patch includes two-dimensional information, three-dimensional information, and index information of a reference patch of the to-be-encoded patch; or the first index is a third value, indicating that the to-be-encoded patch is a third-type patch, and the auxiliary information of the to-be-encoded patch includes two-dimensional information, three-dimensional information, rotation transformation information, and normal coordinate axis information.

Values of the first index may be the first value, the second value, and the third value. Different values indicate different types of patches. Therefore, different types of patches can be distinguished by using the first index. In this way, a quantity of first-type patches does not need to be written into the bitstream, and bit overheads of the bitstream are reduced. In addition, for different types of patches, content included in auxiliary information encoded into the bitstream may be different, and for the first-type patch and the second-type patch, only a portion of auxiliary information is encoded into the bitstream. This can simplify a format of information encoded into the bitstream, reduce the bit overheads of the bitstream, and improve encoding efficiency.

It should be noted that the to-be-encoded patch may be any patch included in a to-be-encoded current point cloud frame. The first index may indicate a type of the to-be-encoded patch. A syntax element of the first index may be patch_mode, patch_type, or the like. When the values of the first index are different, types of the to-be-encoded patch are different.

When the first index is the first value, it may indicate that the to-be-encoded patch is a first-type patch, and the auxiliary information of the to-be-encoded patch encoded into the bitstream includes the three-dimensional information, but does not include the two-dimensional information, the rotation transformation information, and the normal coordinate axis information. When the first index is the second value, it may indicate that the to-be-encoded patch is a second-type patch, and the auxiliary information of the to-be-encoded patch encoded into the bitstream includes the two-dimensional information, the three-dimensional information, and the index information of the reference patch of the to-be-encoded patch, but does not include the rotation transformation information and the normal coordinate axis information. When the first index is the third value, it may indicate that the to-be-encoded patch is a third-type patch, and the auxiliary information of the to-be-encoded patch encoded into the bitstream includes the two-dimensional information, the three-dimensional information, the rotation transformation information, and the normal coordinate axis information.

A patch that has a matching relationship with the first-type patch exists in all point clouds in a current point cloud group, and two-dimensional information, rotation transformation information, and normal coordinate axis information of first-type patches in the current point cloud group may be the same, but three-dimensional information thereof may be different. A patch that has a matching relationship with the second-type patch exists in a reference frame of the current point cloud frame, and rotation transformation information and normal coordinate axis information of the second-type patch and a reference patch of the second-type patch may be the same, but two-dimensional information and three-dimensional information thereof may be different. No patch that has a matching relationship with the third-type patch exists in the reference frame of the current point cloud frame. Therefore, to reduce the bit overheads of the bitstream and further improve the encoding efficiency, when the first index is the first value, the auxiliary information of the to-be-encoded patch may include the three-dimensional information but does not include the two-dimensional information, the rotation transformation information, and the normal coordinate axis information. When the first index is the second value, the auxiliary information of the to-be-encoded patch may include the two-dimensional information, the three-dimensional information, and the index information of the reference patch of the to-be-encoded patch, but does not include the rotation transformation information and the normal coordinate axis information. When the first index is the third value, the auxiliary information of the to-be-encoded patch may include the two-dimensional information, the three-dimensional information, the rotation transformation information, and the normal coordinate axis information.

The first-type patch may be a global matched patch in a current group, the second-type patch may be a local matched patch in the current group, and the third-type patch may be an unmatched patch in the current group. The first value, the second value, and the third value are binary numbers 10, 11, and 00 respectively, or the first value, the second value, and the third value are binary numbers 11, 10, and 00 respectively. The reference patch of the to-be-encoded patch may be included in the reference frame of the current point cloud frame.

It should be noted that the three-dimensional information of the to-be-encoded patch may include a shift of the to-be-encoded patch in a 3D space along a tangent direction (3d_shift_tangent_axis), a shift of the to-be-encoded patch in the 3D space along a bitangent direction (3d_shift_bitangent_axis), and a shift of the to-be-encoded patch in the 3D space along a normal direction (3d_shift_normal_axis). The two-dimensional information of the to-be-encoded patch may include a shift of the to-be-encoded patch in an occupancy map of the current point cloud frame along a u-axis direction (2d_shift_u), a shift of the to-be-encoded patch in the occupancy map of the current point cloud frame along a v-axis direction (2d_shift_v), a width of the to-be-encoded patch in the occupancy map of the current point cloud frame (2d_size_u), and a height of the to-be-encoded patch in the occupancy map of the current point cloud frame (2d_size_v). In addition, a syntax element of the reference patch of the to-be-encoded patch may be patchIndex, used to indicate the index information of the reference patch. The syntax element may further include index information of the reference frame in which the reference patch is located: frameIndex. A syntax element of the rotation transformation information of the to-be-encoded patch may be rotation. In addition, the index information of the reference patch of the to-be-encoded patch may indicate the reference patch of the to-be-encoded patch. The normal coordinate axis information may be a normal axis index of the to-be-encoded patch, for example, a normal axis index normalAxis may be 0, 1, or 2 for an X-axis, a Y-axis, or a Z-axis, respectively.

In an implementation, first indexes of a plurality of patches in the current point cloud frame may be packed together and encoded into the bitstream. For example, first indexes of all patches in the current point cloud frame may be packed together and encoded into the bitstream. In another implementation, a first index of a to-be-encoded patch [i−1] and auxiliary information of the to-be-encoded patch [i−1], a first index of a to-be-encoded patch [i] and auxiliary information of the to-be-encoded patch [i], a first index of a to-be-encoded patch [i+1] and auxiliary information of the to-be-encoded patch [i+1], and the like may be sequentially encoded into the bitstream, in other words, a first index of each patch in the current point cloud frame is separately packed and encoded into the bitstream.

For example, when the first index is the first value, the three-dimensional information of the to-be-encoded patch may be encoded into the bitstream based on three-dimensional information of the reference patch of the to-be-encoded patch. Specifically, the three-dimensional information of the to-be-encoded patch may be encoded into the bitstream in a differential encoding scheme, or may be directly encoded into the bitstream. A specific encoding scheme is not limited. The first index of the to-be-encoded patch is encoded into the bitstream in a fixed-length encoding scheme. When the first index is the second value, the two-dimensional information and the three-dimensional information of the to-be-encoded patch may be encoded into the bitstream based on two-dimensional information and three-dimensional information of the reference patch of the to-be-encoded patch. Specifically, the two-dimensional information and the three-dimensional information of the to-be-encoded patch may be encoded into the bitstream in the differential encoding scheme, or the two-dimensional information and the three-dimensional information of the to-be-encoded patch may be encoded into the bitstream in a more accurate prediction differential scheme. A specific encoding scheme is not limited. The index information of the reference patch and the first index of the to-be-encoded patch are encoded into the bitstream in the fixed-length encoding scheme. When the first index is the third value, the two-dimensional information, the three-dimensional information, the rotation transformation information, the normal coordinate axis information, and the first index of the to-be-encoded patch may be encoded into the bitstream in the fixed-length encoding scheme. The reference patch of the to-be-encoded patch is included in the reference frame of the current point cloud frame.

To determine whether the current point cloud frame is the first frame of point cloud in the current point cloud group during decoding, and further to distinguish the current point cloud group from another point cloud group in a decoding process, in this embodiment of this application, first indexes of all patches included in the first frame of point cloud in the current point cloud group may be set to the third value. In this way, when the current point cloud frame is the first frame of point cloud in the current point cloud group, a first index of the first patch in the current point cloud frame is the third value. When the current point cloud frame is a non-first frame of point cloud in the current point cloud group, the first index of the first patch in the current point cloud frame is the first value. In other words, when the first index of the to-be-encoded patch is the third value, and the to-be-encoded patch is the first patch in the current point cloud frame, it may be determined that the current point cloud frame is the first frame of point cloud in the current point cloud group. In this way, a length of a point cloud frame of the current point cloud group does not need to be encoded into the bitstream, thereby improving encoding efficiency and reducing the bit overheads of the bitstream.

To further reduce the bit overheads of the bitstream, patches included in all point clouds in the current point cloud group may be sequentially arranged in an order of the first-type patch, the second-type patch, and the third-type patch. In this case, for the third-type patch, if the to-be-encoded patch is the first third-type patch, the to-be-encoded patch may be encoded in the fixed-length encoding scheme, or if the to-be-encoded patch is not the first third-type patch, in this case, the two-dimensional information and the three-dimensional information of the to-be-encoded patch may be encoded into the bitstream in the differential encoding scheme based on three-dimensional information of the first third-type patch, and other information is still encoded in the foregoing fixed-length encoding scheme.

Due to some factors, an order of patches included in each frame of point cloud may need to be disrupted when the patches included in the frame of point cloud are encoded. In this case, for ease of decoding, when the first index is the first value, the auxiliary information of the to-be-encoded patch encoded into the bitstream may further include the index information of the reference patch of the to-be-encoded patch. The index information of the reference patch is used to uniquely identify the reference patch of the to-be-encoded patch in the reference frame of the to-beencoded patch. For example, the index information of the reference patch may be a location number of the reference patch in the reference frame.

According to a second aspect, a point cloud decoding method is provided, where the method includes: parsing a first index of a to-be-decoded patch from a bitstream; parsing auxiliary information of the to-be-decoded patch from the bitstream when the first index is a first value, where the auxiliary information includes three-dimensional information of the to-be-decoded patch; or parsing auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parsing auxiliary information of the to-be-decoded patch from the bitstream when the first index is a third value, where the auxiliary information includes two-dimensional information, three-dimensional information, rotation transformation information, and normal coordinate axis information of the to-be-decoded patch; and reconstructing the to-be-decoded patch based on the auxiliary information of the to-be-decoded patch.

First indexes of all patches in a current point cloud frame may be separately packed and encoded into the bitstream, or may be packed together and encoded into the bitstream. Therefore, for a scheme in which the first indexes are separately packed and encoded into the bitstream, if the to-be-decoded patch is the first patch in the current point cloud frame, the first index of the to-be-decoded patch may be parsed from the bitstream. Certainly, for a non-first patch, the first index of the to-be-decoded patch may alternatively be parsed from the bitstream. In other words, a first index of each to-be-decoded patch in the current point cloud frame may be sequentially parsed. For example, a first index of a to-be-decoded patch [i−1] and auxiliary information of the to-be-decoded patch [i−1], a first index of a to-be-decoded patch [i] and auxiliary information of the to-be-decoded patch [i], and a first index of a to-be-decoded patch [i+1] and auxiliary information of the to-be-decoded patch [i+1] are sequentially parsed. For a scheme in which the first indexes are packed together and encoded into the bitstream, if the to-be-decoded patch is the first patch in the current point cloud frame, first indexes of a plurality of patches included in the current point cloud frame may be parsed from the bitstream, and the plurality of parsed first indexes include the first index of the to-be-decoded patch. In other words, the first indexes of the plurality of patches included in the current point cloud frame can be obtained through parsing for only once instead of a plurality of times.

It should be noted that when the first index is the first value, it indicates that the to-be-decoded patch is a first-type patch, in other words, the to-be-decoded patch has a matched patch in all point clouds in a current point cloud group. In this case, the auxiliary information of the to-be-decoded patch can be parsed from the bitstream, where the auxiliary information includes the three-dimensional information of the to-be-decoded patch, but does not include the two-dimensional information, the rotation transformation information, and the normal coordinate axis information of the to-be-decoded patch. When the first index is the second value, it indicates that the to-be-decoded patch is a second-type patch, in other words, a reference patch that matches the to-be-decoded patch exists in a reference frame of the current point cloud frame. In this case, the auxiliary information of the to-be-decoded patch can be parsed from the bitstream, where the auxiliary information includes the two-dimensional information, the three-dimensional information, and the index information of the reference patch of the to-be-decoded patch, but does not include the rotation transformation information and the normal coordinate axis information. When the first index is the third value, it indicates that the to-be-decoded patch is a third-type patch, in other words, no reference patch that matches the to-be-decoded patch exists in the reference frame of the current point cloud frame. In this case, the two-dimensional information, the three-dimensional information, the rotation transformation information, and the normal coordinate axis information of the to-be-decoded patch can be parsed from the bitstream.

When the first index is the first value, for example, decoding may be performed by using a method matching that on an encoder side, for example, the three-dimensional information of the to-be-decoded patch may be parsed from the bitstream in a differential decoding method based on three-dimensional information of a patch whose location in a decoded point cloud is the same as a location of the to-be-decoded patch in the current point cloud frame. For other auxiliary information of the to-be-decoded patch, for example, the two-dimensional information, the rotation transformation information, and the normal coordinate axis information of the to-be-decoded patch, two-dimensional information, rotation transformation information, and normal coordinate axis information of the patch whose location is the same as the location of the to-be-decoded patch in the current point cloud frame may be obtained from the decoded point cloud, and the obtained two-dimensional information, rotation transformation information, and normal coordinate axis information are used as the two-dimensional information, the rotation transformation information, and the normal coordinate axis information of the to-be-decoded patch. Alternatively, two-dimensional information, rotation transformation information, and normal coordinate axis information of the reference patch of the to-be-decoded patch may be obtained from the reference frame of the current point cloud frame, and the two-dimensional information, the rotation transformation information, and the normal coordinate axis information of the reference patch are used as the two-dimensional information, the rotation transformation information, and the normal coordinate axis information of the to-be-decoded patch. In other words, for the first-type patch, the three-dimensional information can be parsed from the bitstream, but the two-dimensional information, the rotation transformation information, and the normal coordinate axis information are derived or obtained. In this way, it is unnecessary to encode the two-dimensional information, the rotation transformation information, and the normal coordinate axis information into the bitstream, so that bit overheads of the bitstream are reduced, and encoding efficiency is improved.

In other words, when the first index is the first value, after the three-dimensional information of the to-be-decoded patch is parsed from the bitstream, the auxiliary information of the to-be-decoded patch may be further obtained based on auxiliary information of the reference patch of the to-be-decoded patch, where the auxiliary information includes the two-dimensional information, the rotation transformation information, and the normal coordinate axis information. In this way, the reconstructing the to-be-decoded patch based on the auxiliary information of the to-be-decoded patch includes: reconstructing the to-be-decoded patch based on the two-dimensional information, the three-dimensional information, the normal coordinate axis information, and the rotation transformation information of the to-be-decoded patch.

When patches in a point cloud are encoded in an arrangement order of the first-type patch, the second-type patch, and the third-type patch, the reference patch of the to-be-decoded patch may be a patch whose location in the reference frame of the current point cloud frame is the same as the location of the to-be-decoded patch in the current point cloud frame. However, in some cases, first-type patches, second-type patches, and third-type patches in each frame of point cloud in the current point cloud group are not arranged in order. In this case, when the first index is the first value, the auxiliary information of the to-be-decoded patch parsed from the bitstream may further include the index information of the reference patch of the to-be-decoded patch. In this way, during decoding, when the parsed first index is the first value, the auxiliary information parsed from the bitstream may further include the index information of the reference patch of the to-be-decoded patch. Then, the reference patch of the to-be-decoded patch may be determined based on the index information of the reference patch of the to-be-decoded patch.

When the first index is the second value, the index information of the reference patch of the to-be-decoded patch may be parsed from the bitstream by using a method matching that on the encoder side, for example, may be parsed in a fixed-length decoding scheme. For the rotation transformation information and the normal coordinate axis information of the to-be-decoded patch, the reference patch of the to-be-decoded patch may be determined by using the index information of the reference patch of the to-be-decoded patch, rotation transformation information and normal coordinate axis information of the reference patch of the to-be-decoded patch are further obtained, and the rotation transformation information and the normal coordinate axis information of the reference patch are used as the rotation transformation information and the normal coordinate axis information of the to-be-decoded patch. The two-dimensional information and the three-dimensional information of the to-be-decoded patch may be decoded, for example, by using a method matching that on the encoder side, for example, the two-dimensional information and the three-dimensional information of the to-be-decoded patch may be parsed from the bitstream in the differential decoding scheme. In other words, for the second-type patch, the two-dimensional information and the three-dimensional information may be parsed from the bitstream, but the rotation transformation information and the normal coordinate axis information are derived or obtained. In this way, it is unnecessary to encode the rotation transformation information and the normal coordinate axis information into the bitstream, so that the bit overheads of the bitstream are reduced, and the encoding efficiency is improved.

In other words, when the first index is the second value, after the two-dimensional information and the three-dimensional information of the to-be-decoded patch, and the index information of the reference patch of the to-be-decoded patch are parsed from the bitstream, the rotation transformation information and the normal coordinate axis information of the to-be-decoded patch may be further obtained based on the index information of the reference patch of the to-be-decoded patch. In this way, the reconstructing the to-be-decoded patch based on the auxiliary information of the to-be-decoded patch includes: reconstructing the to-be-decoded patch based on the two-dimensional information, the three-dimensional information, the normal coordinate axis information, and the rotation transformation information of the to-be-decoded patch.

When the first index is the third value, for example, decoding may be performed by using a method matching that on the encoder side, for example, the two-dimensional information, the three-dimensional information, the rotation transformation information, and the normal coordinate axis information of the to-be-decoded patch are parsed from the bitstream in the fixed-length decoding scheme. However, if auxiliary information of the first third-type patch is encoded in a fixed-length encoding scheme, two-dimensional information and three-dimensional information of a non-first third-type patch are encoded in a differential encoding scheme, and other auxiliary information is encoded in a fixed-length encoding scheme, for the non-first third-type patch, the two-dimensional information and the three-dimensional information of the to-be-decoded patch are parsed from the bitstream in the differential decoding scheme based on two-dimensional information and three-dimensional information of the first third-type patch, and the rotation transformation information and the normal coordinate axis information of the to-be-decoded patch are parsed from the bitstream in the fixed-length decoding scheme. In other words, for the third-type patch, the two-dimensional information and the three-dimensional information of the non-first third-type patch may be parsed from the bitstream, but the rotation transformation information and the normal coordinate axis information are derived or obtained. In this way, it is unnecessary to encode the rotation transformation information and the normal coordinate axis information into the bitstream, so that the bit overheads of the bitstream are reduced, and the encoding efficiency is improved.

The first value, the second value, and the third value are binary numbers 10, 11, and 00 respectively, or the first value, the second value, and the third value are binary numbers 11, 10, and 00 respectively. The reference patch of the to-be-decoded patch is included in the reference frame of the current point cloud frame.

Based on the foregoing description, first-type patches, second-type patches, and third-type patches in each frame of point cloud in the current point cloud group may be arranged in order. In this case, if the to-be-decoded patch is the first patch in the current point cloud frame, after the first index of the to-be-decoded patch is parsed from the bitstream, it may be determined, based on the value of the first index, whether the current point cloud frame is the first frame of point cloud in the current point cloud group. In other words, when the to-be-decoded patch is the first patch in the current point cloud frame, and the first index is the third value, it may be determined that the current point cloud frame is the first frame of point cloud in the current point cloud group. In this case, a length of a point cloud group does not need to be encoded into the bitstream.

However, in some cases, the first-type patches, the second-type patches, and the third-type patches in each frame of point cloud in the current point cloud group are not arranged in order, in other words, a first index of the first patch in any frame of point cloud in the current point cloud group may be the first value, the second value, or the third value. In this case, when the to-be-decoded patch is the first patch in the current point cloud frame, it cannot be determined, based on the first index parsed from the bitstream, whether the current point cloud frame is the first frame of point cloud in the current point cloud group. In this case, first indexes of a plurality of patches included in the current point cloud frame may be determined. In a possible implementation, the plurality of patches are all patches included in the current point cloud frame. If all the first indexes of the plurality of patches are the third value, it may be determined that the current point cloud frame is the first frame of point cloud in the current point cloud group.

It should be noted that after the auxiliary information of the to-be-decoded patch is obtained, in other words, after the two-dimensional information, the three-dimensional information, the rotation transformation information, and the normal coordinate axis information of the to-be-decoded patch are obtained, the to-be-decoded patch may be reconstructed based on but not limited to such auxiliary information. This application sets no limitation on specific information required for reconstructing the to-be-decoded patch.

According to a third aspect, a point cloud encoding method is provided, where the method includes: obtaining auxiliary information of a to-be-encoded patch; and encoding the auxiliary information of the to-be-encoded patch and a first index of the to-be-encoded patch into a bitstream, where the first index is a first value, indicating that the to-be-encoded patch is a first-type patch, and information encoded into the bitstream further includes a second index, where the second index is a fourth value, indicating that three-dimensional information of the to-be-encoded patch is not encoded into the bitstream, or the second index is a fifth value, indicating that three-dimensional information of the to-be-encoded patch is encoded into the bitstream, and the auxiliary information of the to-be-encoded patch includes the three-dimensional information; or the first index is a second value, indicating that the to-be-encoded patch is a second-type patch, and the auxiliary information of the to-be-encoded patch includes two-dimensional information, three-dimensional information, and index information of a reference patch of the to-be-encoded patch; or the first index is a third value, indicating that the to-be-encoded patch is a third-type patch, and the auxiliary information of the to-be-encoded patch includes two-dimensional information, three-dimensional information, rotation transformation information, and normal coordinate axis information.

When the first index is the first value, it may indicate that the to-be-encoded patch is a first-type patch, and the information encoded into the bitstream may further include the second index.

It should be noted that the second index is used to indicate whether the three-dimensional information of the to-be-encoded patch is encoded into the bitstream. A syntax element of the second index may be override_3d_shift_data_flag. When the second index is the fourth value, it may indicate that the three-dimensional information of the to-be-encoded patch is not encoded into the bitstream. In other words, the three-dimensional information of the to-be-encoded patch is the same as three-dimensional information of the reference patch of the to-be-encoded patch. Therefore, the three-dimensional information of the to-be-encoded patch may not need to be encoded into the bitstream, in other words, the auxiliary information of the to-be-encoded patch may not include the three-dimensional information. When the second index is the fifth value, it may indicate that the three-dimensional information of the to-be-encoded patch is encoded into the bitstream. In other words, the three-dimensional information of the to-be-encoded patch is different from the three-dimensional information of the reference patch of the to-be-encoded patch. Therefore, the three-dimensional information of the to-be-encoded patch needs to be encoded into the bitstream, in other words, the auxiliary information of the to-be-encoded patch may include the three-dimensional information. A syntax element of the fourth value may be true, and a syntax element of the fifth value may be false.

When the first index is the second value, it may indicate that the to-be-encoded patch is a second-type patch. In other words, a reference patch that matches the to-be-encoded patch exists in a reference frame of a current point cloud frame. The auxiliary information of the to-be-encoded patch includes the two-dimensional information, the three-dimensional information, and the index information of the reference patch of the to-be-encoded patch.

When the first index is the third value, it may indicate that the to-be-encoded patch is a third-type patch. In other words, no reference patch that matches the to-be-encoded patch exists in the reference frame of the current point cloud frame. The auxiliary information of the to-be-encoded patch includes the two-dimensional information, the three-dimensional information, the rotation transformation information, and the normal coordinate axis information.

According to a fourth aspect, a point cloud decoding method is provided, where the method includes: parsing a first index of a to-be-decoded patch from a bitstream; parsing a second index of the to-be-decoded patch from the bitstream when the first index is a first value, and using auxiliary information of a reference patch of the to-be-decoded patch as auxiliary information of the to-be-decoded patch when the second index is a fourth value, or parsing auxiliary information of the to-be-decoded patch from the bitstream when the second index is a fifth value, where the auxiliary information includes three-dimensional information of the to-be-decoded patch; or parsing auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parsing auxiliary information of the to-be-decoded patch from the bitstream when the first index is a third value, where the auxiliary information includes two-dimensional information, three-dimensional information, rotation transformation information, and normal coordinate axis information of the to-be-decoded patch; and reconstructing the to-be-decoded patch based on the auxiliary information of the to-be-decoded patch.

It should be noted that when the second index is the fourth value, it may indicate that the three-dimensional information of the to-be-decoded patch is not encoded into the bitstream. In other words, the three-dimensional information of the to-be-decoded patch is the same as three-dimensional information of the reference patch of the to-be-decoded patch. In this case, the auxiliary information of the reference patch of the to-be-decoded patch may be used as the auxiliary information of the to-be-decoded patch. When the second index is the fifth value, it may indicate that the three-dimensional information of the to-be-decoded patch is encoded into the bitstream, and the auxiliary information of the to-be-decoded patch includes the three-dimensional information. In this case, the auxiliary information of the to-be-decoded patch is parsed from the bitstream, and the auxiliary information includes the three-dimensional information of the to-be-decoded patch. For example, the auxiliary information of the to-be-decoded patch may be parsed from the bitstream in a differential decoding scheme.

According to a fifth aspect, a point cloud encoding apparatus is provided, where the apparatus includes: a patch information obtaining module, configured to obtain auxiliary information of a to-be-encoded patch; and an auxiliary information encoding module, configured to encode the auxiliary information of the to-be-encoded patch and a first index of the to-be-encoded patch into a bitstream, where the first index is a first value, indicating that the to-be-encoded patch is a first-type patch, and the auxiliary information of the to-be-encoded patch includes three-dimensional information; or the first index is a second value, indicating that the to-be-encoded patch is a second-type patch, and the auxiliary information of the to-be-encoded patch includes two-dimensional information, three-dimensional information, and index information of a reference patch of the to-be-encoded patch; or the first index is a third value, indicating that the to-be-encoded patch is a third-type patch, and the auxiliary information of the to-be-encoded patch includes two-dimensional information, three-dimensional information, rotation transformation information, and normal coordinate axis information.

When the first index of the to-be-encoded patch is the third value, and the to-be-encoded patch is the first patch in a current point cloud frame to which the to-be-encoded patch belongs, the current point cloud frame is the first point cloud frame.

The first value, the second value, and the third value are binary numbers 10, 11, and 00 respectively, or the first value, the second value, and the third value are binary numbers 11, 10, and 00 respectively.

The reference patch of the to-be-encoded patch is included in a reference frame of the current point cloud frame.

The first-type patch is a global matched patch in a current group, the second-type patch is a local matched patch in the current group, and the third-type patch is an unmatched patch in the current group.

According to a sixth aspect, a point cloud decoding apparatus is provided, where the apparatus includes: an auxiliary information decoding module, configured to parse a first index of a to-be-decoded patch from a bitstream, where the auxiliary information decoding module is further configured to: parse auxiliary information of the to-be-decoded patch from the bitstream when the first index is a first value, where the auxiliary information includes three-dimensional information of the to-be-decoded patch; or parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parse auxiliary information of the to-be-decoded patch from the bitstream when the first index is a third value, where the auxiliary information includes two-dimensional information, three-dimensional information, rotation transformation information, and normal coordinate axis information of the to-be-decoded patch; and a reconstruction module, configured to reconstruct the to-be-decoded patch based on the auxiliary information of the to-be-decoded patch.

The first value, the second value, and the third value are binary numbers 10, 11, and 00 respectively, or the first value, the second value, and the third value are binary numbers 11, 10, and 00 respectively.

The auxiliary information decoding module is further configured to:
when the to-be-decoded patch is the first patch, and the first index is the third value, determine that a current point cloud frame to which the to-be-decoded patch belongs is the first point cloud frame.

The auxiliary information decoding module is further configured to:
parse the first index of the to-be-decoded patch from the bitstream when the to-be-decoded patch is the first patch in the current point cloud frame; or parse a plurality of first indexes of a plurality of patches included in the current point cloud frame from the bitstream when the to-be-decoded patch is the first patch in the current point cloud frame, where the plurality of parsed first indexes include the first index of the to-be-decoded patch.

When the first index is the first value, the auxiliary information decoding module is further configured to: obtain the two-dimensional information, the rotation transformation information, and the normal coordinate axis information of the to-be-decoded patch based on auxiliary information of the reference patch of the to-be-decoded patch; and the reconstruction module is further configured to: reconstruct the to-be-decoded patch based on the two-dimensional information, the three-dimensional information, the normal coordinate axis information, and the rotation transformation information of the to-be-decoded patch.

When the first index is the second value, the auxiliary information decoding module is further configured to: obtain the rotation transformation information and the normal coordinate axis information of the to-be-decoded patch based on the index information of the reference patch of the to-be-decoded patch; and the reconstruction module is further configured to: reconstruct the to-be-decoded patch based on the two-dimensional information, the three-dimensional information, the normal coordinate axis information, and the rotation transformation information of the to-be-decoded patch.

The reference patch of the to-be-decoded patch is included in a reference frame of the current point cloud frame.

According to a seventh aspect, a point cloud encoding apparatus is provided, where the apparatus includes a patch information obtaining module, configured to obtain auxiliary information of a to-be-encoded patch; and
an auxiliary information encoding module, configured to encode the auxiliary information of the to-be-encoded patch and a first index of the to-be-encoded patch into a bitstream, where
the first index is a first value, indicating that the to-be-encoded patch is a first-type patch, and information encoded into the bitstream further includes a second index, where the second index is a fourth value, indicating that three-dimensional information of the to-be-encoded patch is not encoded into the bitstream, or the second index is a fifth value, indicating that three-dimensional information of the to-be-encoded patch is encoded into the bitstream, and the auxiliary information of the to-be-encoded patch includes the three-dimensional information; or
the first index is a second value, indicating that the to-be-encoded patch is a second-type patch, and the auxiliary information of the to-be-encoded patch includes two-dimensional information, three-dimensional information, and index information of a reference patch of the to-be-encoded patch; or
the first index is a third value, indicating that the to-be-encoded patch is a third-type patch, and the auxiliary information of the to-be-encoded patch includes two-dimensional information, three-dimensional information, rotation transformation information, and normal coordinate axis information.

According to an eighth aspect, a point cloud decoding apparatus is provided, where the apparatus includes an auxiliary information decoding module, configured to parse a first index of a to-be-decoded patch from a bitstream, where the auxiliary information decoding module is further configured to: parse a second index of the to-be-decoded patch from the bitstream when the first index is a first value, and use auxiliary information of a reference patch of the to-be-decoded patch as auxiliary information of the to-be-decoded patch when the second index is a fourth value, or parse auxiliary information of the to-be-decoded patch from the bitstream when the second index is a fifth value, where the auxiliary information includes three-dimensional information of the to-be-decoded patch; or parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parse auxiliary information of the to-be-decoded patch from the bitstream when the first index is a third value, where the auxiliary information includes two-dimensional information, three-dimensional information, rotation transformation information, and normal coordinate axis information of the to-be-decoded patch; and a reconstruction module, configured to reconstruct the to-be-decoded patch based on the auxiliary information of the to-be-decoded patch.

According to a ninth aspect, a point cloud encoding method is provided, where the method includes: obtaining auxiliary information of a to-be-encoded patch; and encoding the auxiliary information of the to-be-encoded patch and a syntax element of the to-be-encoded patch into a bitstream, where the syntax element includes a first syntax element.

When the first syntax element indicates that the to-be-encoded patch has a reference patch, the syntax element encoded into the bitstream further includes a second syntax element, a value of the second syntax element is true, indicating that two-dimensional information of the to-be-encoded patch is encoded into the bitstream but three-dimensional information of the to-be-encoded patch is not encoded into the bitstream, and the auxiliary information of the to-be-encoded patch includes the two-dimensional information; or the syntax element encoded into the bitstream further includes a second syntax element and a third syntax element, a value of the second syntax element is false and a value of the third syntax element is true, indicating that two-dimensional information of the to-be-encoded patch is not encoded into the bitstream but three-dimensional information of the to-be-encoded patch is encoded into the bitstream, and the auxiliary information of the to-be-encoded patch includes the three-dimensional information; or the syntax element encoded into the bitstream further includes a second syntax element and a third syntax element, a value of the second syntax element is false and a value of the third syntax element is false, indicating that two-dimensional information of the to-be-encoded patch is not encoded into the bitstream and three-dimensional information of the to-be-encoded patch is not encoded into the bitstream.

Optionally, when the first syntax element indicates that the to-be-encoded patch does not have a reference patch, the auxiliary information of the to-be-encoded patch includes the two-dimensional information, the three-dimensional information, rotation transformation information, and normal coordinate axis information.

Optionally, when the first syntax element indicates that the to-be-encoded patch does not have a reference patch, and the to-be-encoded patch is the first patch in a current point cloud frame to which the to-be-encoded patch belongs, the current point cloud frame is the first point cloud frame.

Optionally, the reference patch of the to-be-encoded patch is included in a reference frame of the current point cloud frame.

Optionally, a location of the to-be-encoded patch in the current point cloud frame is the same as a location of the reference patch of the to-be-encoded patch in the reference frame of the current point cloud frame.

According to a tenth aspect, a point cloud decoding method is provided, where the method includes: parsing a first syntax element of a to-be-decoded patch from a bitstream; parsing a second syntax element of the to-be-decoded patch from the bitstream or parsing a second syntax element and a third syntax element of the to-be-decoded patch from the bitstream when the first syntax element indicates that the to-be-decoded patch has a reference patch; when a value of the second syntax element is true, parsing two-dimensional information of the to-be-decoded patch from the bitstream, and using three-dimensional information of the reference patch of the to-be-decoded patch as three-dimensional information of the to-be-decoded patch; or when a value of the second syntax element is false and a value of the third syntax element is true, parsing three-dimensional information of the to-be-decoded patch from the bitstream, and using two-dimensional information of the reference patch of the to-be-decoded patch as two-dimensional information of the to-be-decoded patch; or when a value of the second syntax element is false and a value of the third syntax element is false, using two-dimensional information of the reference patch of the to-be-decoded patch as two-dimensional information of the to-be-decoded patch, and using three-dimensional information of the reference patch of the to-be-decoded patch as three-dimensional information of the to-be-decoded patch; and reconstructing the to-be-decoded patch based on auxiliary information of the to-be-decoded patch, where the auxiliary information of the to-be-decoded patch includes the two-dimensional information of the to-be-decoded patch and the three-dimensional information of the to-be-decoded patch.

Optionally, the method further includes: parsing the auxiliary information of the to-be-decoded patch from the bitstream when the first syntax element indicates that the to-be-decoded patch does not have a reference patch, where the auxiliary information of the to-be-decoded patch includes the two-dimensional information, the three-dimensional information, rotation transformation information, and normal coordinate axis information.

Optionally, the method further includes: when the to-be-decoded patch is the first patch, and the first syntax element indicates that the to-be-decoded patch does not have a reference patch, determining that a current point cloud frame to which the to-be-decoded patch belongs is the first point cloud frame.

Optionally, the parsing a first syntax element of a to-be-decoded patch from a bitstream includes: parsing the first syntax element of the to-be-decoded patch from the bitstream when the to-be-decoded patch is the first patch in the current point cloud frame; or parsing a plurality of first syntax elements of a plurality of patches included in the current point cloud frame from the bitstream when the to-be-decoded patch is the first patch in the current point cloud frame, where the plurality of parsed first syntax elements include the first syntax element of the to-be-decoded patch.

Optionally, the reference patch of the to-be-decoded patch is included in a reference frame of the current point cloud frame.

Optionally, a location of the to-be-decoded patch in the current point cloud frame is the same as a location of the reference patch of the to-be-decoded patch in the reference frame of the current point cloud frame.

According to an eleventh aspect, a point cloud encoding apparatus is provided, where the apparatus includes a point cloud patch information obtaining module, configured to obtain auxiliary information of a to-be-encoded patch; and an auxiliary information encoding module, configured to encode the auxiliary information of the to-be-encoded patch and a syntax element of the to-be-encoded patch into a bitstream, where the syntax element includes a first syntax element, where:

when the first syntax element indicates that the to-be-encoded patch has a reference patch, the syntax element encoded into the bitstream further includes a second syntax element, a value of the second syntax element is true, indicating that two-dimensional information of the to-be-encoded patch is encoded into the bitstream but three-dimensional information of the to-be-encoded patch is not encoded into the bitstream, and the auxiliary information of the to-be-encoded patch includes the two-dimensional information; or the syntax element encoded into the bitstream further includes a second syntax element and a third syntax element, a value of the second syntax element is false and a value of the third syntax element is true, indicating that two-dimensional information of the to-be-encoded patch is not encoded into the bitstream but three-dimensional information of the to-be-encoded patch is encoded into the bitstream, and the auxiliary information of the to-be-encoded patch includes the three-dimensional information; or the syntax element encoded into the bitstream further includes a second syntax element and a third syntax element, a value of the second syntax element is false and a value of the third syntax element is false, indicating that two-dimensional information of the to-be-encoded patch is not encoded into the bitstream and three-dimensional information of the to-be-encoded patch is not encoded into the bitstream.

Optionally, when the first syntax element indicates that the to-be-encoded patch does not have a reference patch, the auxiliary information of the to-be-encoded patch includes the two-dimensional information, the three-dimensional information, rotation transformation information, and normal coordinate axis information.

Optionally, when the first syntax element indicates that the to-be-encoded patch does not have a reference patch, and the to-be-encoded patch is the first patch in a current point cloud frame to which the to-be-encoded patch belongs, the current point cloud frame is the first point cloud frame.

Optionally, the reference patch of the to-be-encoded patch is included in a reference frame of the current point cloud frame.

Optionally, a location of the to-be-encoded patch in the current point cloud frame is the same as a location of the reference patch of the to-be-encoded patch in the reference frame of the current point cloud frame.

According to a twelfth aspect, a point cloud decoding apparatus is provided, where the apparatus includes an auxiliary information decoding module, configured to parse a first syntax element of a to-be-decoded patch from a bitstream, where the auxiliary information decoding module is further configured to: parse a second syntax element of the to-be-decoded patch from the bitstream or parse a second syntax element and a third syntax element of the to-be-decoded patch from the bitstream when the first syntax element indicates that the to-be-decoded patch has a reference patch; when a value of the second syntax element is true, parse two-dimensional information of the to-be-decoded patch from the bitstream, and use three-dimensional information of the reference patch of the to-be-decoded patch as three-dimensional information of the to-be-decoded patch; or when a value of the second syntax element is false and a value of the third syntax element is true, parse three-dimensional information of the to-be-decoded patch from the bitstream, and use two-dimensional information of the reference patch of the to-be-decoded patch as two-dimensional information of the to-be-decoded patch; or when a value of the second syntax element is false and a value of the third syntax element is false, use two-dimensional information of the reference patch of the to-be-decoded patch as two-dimensional information of the to-be-decoded patch, and use three-dimensional information of the reference patch of the to-be-decoded patch as three-dimensional information of the to-be-decoded patch; and a reconstruction module, configured to reconstruct the to-be-decoded patch based on auxiliary information of the to-be-decoded patch, where the auxiliary information of the to-be-decoded patch includes the two-dimensional information of the to-be-decoded patch and the three-dimensional information of the to-be-decoded patch.

Optionally, the auxiliary information decoding module is further configured to: parse the auxiliary information of the to-be-decoded patch from the bitstream when the first syntax element indicates that the to-be-decoded patch does not have a reference patch, where the auxiliary information of the to-be-decoded patch includes the two-dimensional information, the three-dimensional information, rotation transformation information, and normal coordinate axis information.

Optionally, the auxiliary information decoding module is further configured to: when the to-be-decoded patch is the first patch, and the first syntax element indicates that the to-be-decoded patch does not have a reference patch, determine that a current point cloud frame to which the to-be-decoded patch belongs is the first point cloud frame.

Optionally, the auxiliary information decoding module is further configured to: parse the first syntax element of the to-be-decoded patch from the bitstream when the to-be-decoded patch is the first patch in the current point cloud frame; or parse a plurality of first syntax elements of a plurality of patches included in the current point cloud frame from the bitstream when the to-be-decoded patch is the first patch in the current point cloud frame, where the plurality of parsed first syntax elements include the first syntax element of the to-be-decoded patch.

Optionally, the reference patch of the to-be-decoded patch is included in a reference frame of the current point cloud frame.

Optionally, a location of the to-be-decoded patch in the current point cloud frame is the same as a location of the reference patch of the to-be-decoded patch in the reference frame of the current point cloud frame.

According to a thirteenth aspect, a device for encoding point cloud data is provided, where the device may include a memory and an encoder. The memory is configured to store point cloud data. The encoder is configured to perform the point cloud encoding method provided in the first aspect or any possible design of the first aspect, or the encoder is configured to perform the point cloud encoding method provided in the third aspect or any possible design of the third aspect, or the encoder is configured to perform the point cloud encoding method provided in the ninth aspect or any possible design of the ninth aspect.

According to a fourteenth aspect, a device for decoding point cloud data is provided, where the device may include a memory and a decoder. The memory is configured to store point cloud data in a bitstream form. The decoder is configured to perform the point cloud decoding method provided in the second aspect or any possible design of the second aspect, or the decoder is configured to perform the point cloud decoding method provided in the fourth aspect or any possible design of the fourth aspect, or the decoder is configured to perform the point cloud decoding method provided in the tenth aspect or any possible design of the tenth aspect.

According to a fifteenth aspect, an encoding apparatus is provided, including a memory and a processor, where the memory is configured to store program code; and the processor is configured to invoke the program code to perform the point cloud encoding method provided in the first aspect, the third aspect, or the ninth aspect.

According to a sixteenth aspect, a decoding apparatus is provided, including a memory and a processor, where the memory is configured to store program code; and the processor is configured to invoke the program code to perform the point cloud decoding method provided in the second aspect, the fourth aspect, or the tenth aspect.

This application further provides a computer readable storage medium, including program code. When the program code is run on a computer, the computer is enabled to perform any point cloud encoding method provided in the first aspect and its possible designs, any point cloud encoding method provided in the third aspect and its possible designs, or any point cloud encoding method provided in the ninth aspect and its possible designs.

This application further provides a computer readable storage medium, including program code. When the program code is run on a computer, the computer is enabled to perform any point cloud decoding method provided in the second aspect and its possible designs, any point cloud decoding method provided in the fourth aspect and its possible designs, or any point cloud decoding method provided in the tenth aspect and its possible designs.

This application further provides a computer program product. When the computer program product is run on a computer, the computer is enabled to perform some or all steps of the point cloud encoding method provided in the first aspect or any possible design of the first aspect, or perform some or all steps of the point cloud encoding method provided in the third aspect or any possible design of the third aspect, or perform some or all steps of the point cloud encoding method provided in the ninth aspect or any possible design of the ninth aspect.

This application further provides a computer program product. When the computer program product is run on a computer, the computer is enabled to perform some or all steps of the point cloud decoding method provided in the second aspect or any possible design of the second aspect, or perform some or all steps of the point cloud decoding method provided in the fourth aspect or any possible design of the fourth aspect, or perform some or all steps of the point cloud decoding method provided in the tenth aspect or any possible design of the tenth aspect.

It should be understood that, for beneficial effects of any one of the foregoing provided codec apparatuses, computer readable storage media, and computer program products, reference may be correspondingly made to beneficial effects of the method embodiments provided in the foregoing corresponding aspects.

The technical solutions provided in this application may have at least the following beneficial effects:

In the embodiments of this application, auxiliary information of a to-be-encoded patch is first obtained, and then the auxiliary information and a first index of the to-be-encoded patch are encoded into a bitstream. Values of the first index may be a first value, a second value, and a third value. Different values indicate different types of patches. Therefore, different types of patches can be distinguished by using the first index. In this way, a quantity of first-type patches does not need to be written into the bitstream, and bit overheads of the bitstream are reduced. In addition, for different types of patches, content included in auxiliary information encoded into the bitstream may be different, and for a first-type patch and a second-type patch, only a portion of auxiliary information is encoded into the bitstream. This can simplify a format of information encoded into the bitstream, reduce the bit overheads of the bitstream, and improve encoding efficiency.

DESCRIPTION OF EMBODIMENTS

To make the objectives, technical solutions, and advantages of this application clearer, the following further describes the implementations of this application in detail with reference to the accompanying drawings.

In the embodiments of this application, "a plurality of" refers to two or more than two. In description of this application, "/" means "or" unless otherwise specified. For example, A/B may represent A or B. In this specification, "and/or" describes only an association relationship for describing associated objects and represents that three relationships may exist. For example, A and/or B may represent the following three cases: Only A exists, both A and B exist, and only B exists. In addition, to facilitate clear description of the technical solutions in the embodiments of this application, in the embodiments of this application, words such as "first" and "second" are used to distinguish between same or similar items whose functionalities and functions are basically the same. A person skilled in the art may understand that the words such as "first" and "second" do not limit a quantity or an execution sequence, and the words such as "first" and "second" do not mean being definitely different.

Before the embodiments of this application are described in detail, an implementation environment of the embodiments of this application is first described.

Figure 1:
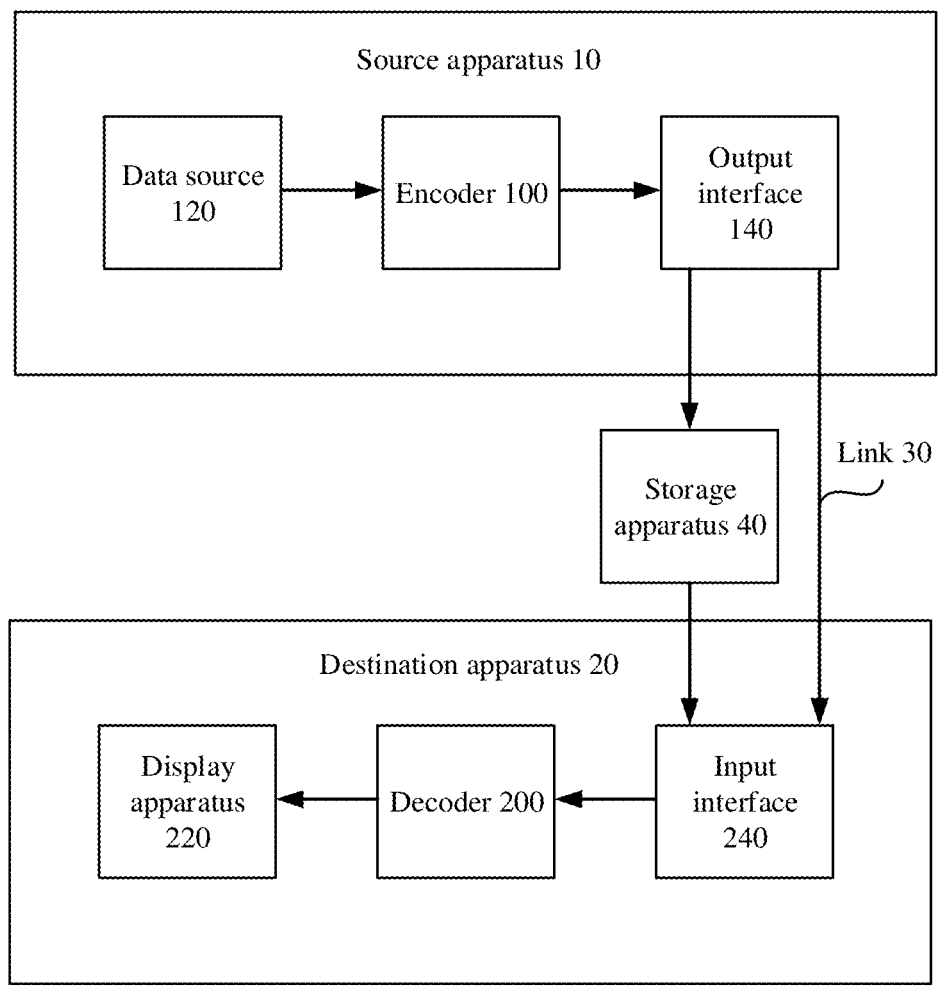
FIG. 1 is a schematic block diagram of a point cloud coding system according to an embodiment of this application.

An implementation environment provided in the embodiments of this application includes a point cloud coding system. FIG. 1 is a schematic block diagram of a point cloud coding system according to an embodiment of this application. A term "point cloud coding" or "coding" may generally refer to point cloud encoding or point cloud decoding. Referring to FIG. 1, the point cloud coding system includes a source apparatus 10, a destination apparatus 20, a link 30, and a storage apparatus 40. The source apparatus 10 may generate encoded point cloud data. Therefore, the source apparatus 10 may also be referred to as a point cloud encoding apparatus. The destination apparatus 20 may decode the encoded point cloud data generated by the source apparatus 10. Therefore, the destination apparatus 20 may also be referred to as a point cloud decoding apparatus. The link 30 may receive the encoded point cloud data generated by the source apparatus 10, and may transmit the encoded point cloud data to the destination apparatus 20. The storage apparatus 40 may receive the encoded point cloud data generated by the source apparatus 10, and may store the encoded point cloud data. In this way, the destination apparatus 20 may directly obtain the encoded point cloud data from the storage apparatus 40. Alternatively, the storage apparatus 40 may correspond to a file server or another intermediate storage apparatus that may store the encoded point cloud data generated by the source apparatus 10. In this way, the destination apparatus 20 may stream or download the encoded point cloud data stored in the storage apparatus 40.

Both the source apparatus 10 and the destination apparatus 20 may include one or more processors and a memory coupled to the one or more processors. The memory may include a random access memory (RAM), a read-only memory (ROM), an electrically erasable programmable read-only memory (EEPROM), a flash memory, any other medium that may be configured to store required program code in a form of an instruction or a data structure accessible to a computer, or the like. For example, both the source apparatus 10 and the destination apparatus 20 may include a desktop computer, a mobile computing apparatus, a notebook (for example, a laptop) computer, a tablet computer, a set-top box, a telephone handset such as a so-called "smart" phone, a television set, a camera, a display apparatus, a digital media player, a video game console, an in-vehicle computer, or the like.

The link 30 may include one or more media or apparatuses capable of transmitting the encoded point cloud data from the source apparatus 10 to the destination apparatus 20. In a possible implementation, the link 30 may include one or more communication media that enable the source apparatus 10 to send the encoded point cloud data directly to the destination apparatus 20 in real time. In this embodiment of this application, the source apparatus 10 may modulate the encoded point cloud data based on a communication standard. The communication standard may be a wireless communication protocol or the like, and modulated point cloud data may be sent to the destination apparatus 20. The one or more communication media may include wireless and/or wired communication media, for example, the one or more communication media may include a radio frequency (RF) spectrum or one or more physical transmission lines. The one or more communication media may form a part of a packet-based network, and the packet-based network may be a local area network, a wide area network, a global network (for example, Internet), or the like. The one or more communication media may include a router, a switch, a base station, another device that facilitates communication from the source apparatus 10 to the destination apparatus 20, or the like. This is not specifically limited in embodiments of this application.

In a possible implementation, the storage apparatus 40 may store the received encoded point cloud data sent by the source apparatus 10, and the destination apparatus 20 may directly obtain the encoded point cloud data from the storage apparatus 40. In this way, the storage apparatus 40 may include any one of a plurality of distributed or locally accessed data storage media. For example, any one of the plurality of distributed or locally accessed data storage media may be a hard disk drive, a Blu-ray disc, a digital versatile disc (DVD), a compact disc read-only memory (CD-ROM), a flash memory, a volatile or non-volatile memory, or any other suitable digital storage medium configured to store the encoded point cloud data.

In a possible implementation, the storage apparatus 40 may correspond to a file server or another intermediate storage apparatus that may store the encoded point cloud data generated by the source apparatus 10, and the destination apparatus 20 may stream or download the point cloud data stored in the storage apparatus 40. The file server may be any type of server that can store the encoded point cloud data and send the encoded point cloud data to the destination apparatus 20. In a possible implementation, the file server may include a network server, a file transfer protocol (FTP) server, a network attached storage (NAS) apparatus, a local disk drive, and the like. The destination apparatus 20 may obtain the encoded point cloud data by using any standard data connection (including an Internet connection). The any standard data connection may include a wireless channel (for example, a Wi-Fi connection), a wired connection (for example, a digital subscriber line (DSL) or a cable modem), or a combination of the wireless channel and the wired connection adapted to obtain the encoded point cloud data stored on the file server. Transmission of the encoded point cloud data from the storage apparatus 40 may be streaming transmission, download transmission, or a combination of the two.

The point cloud coding system shown in FIG. 1 is only a possible implementation. Moreover, in addition to being applied to the source apparatus 10 for encoding the point cloud data and the destination apparatus 20 for decoding the encoded point cloud data shown in FIG. 1, the technologies in this application may be further applied to another apparatus that can encode the point cloud and decode the encoded point cloud data. This is not specifically limited in this embodiment of this application.

In the point cloud coding system shown in FIG. 1, the source apparatus 10 includes a data source 120, an encoder 100, and an output interface 140. In some embodiments, the output interface 140 may include a modulator/demodulator (modem) and/or a transmitter, where the transmitter may also be referred to as a transmitter. The data source 120 may include a point cloud capturing apparatus (for example, a camera), a point cloud archive containing previously captured point cloud data, a point cloud feed-in interface for receiving point cloud data from a point cloud content provider, and/or a computer graphics system for generating point cloud data, or a combination of these sources of point cloud data.

The data source 120 may send a point cloud to the encoder 100, and the encoder 100 may encode the received point cloud sent from the data source 120 to obtain encoded point cloud data. The encoder may send the encoded point cloud data to the output interface. In some embodiments, the source apparatus 10 sends the encoded point cloud data directly to the destination apparatus 20 through the output interface 140. In another embodiment, the encoded point cloud data may further be stored on the storage apparatus 40 for the destination apparatus 20 to obtain subsequently for decoding and/or playback.

In the embodiment of FIG. 1, the destination apparatus 20 includes an input interface 240, a decoder 200, and a display apparatus 220. In some embodiments, the input interface 240 includes a receiver and/or a modem. The input interface 240 may receive the encoded point cloud data through the link 30 and/or from the storage apparatus 40, and then send the encoded point cloud data to the decoder 200. The decoder 200 may decode the received encoded point cloud data to obtain decoded point cloud data. The decoder may send the decoded point cloud data to the display apparatus 220. The display apparatus 220 may be integrated with the destination apparatus 20 or may be external to the destination apparatus 20. Generally, the display apparatus 220 displays the decoded point cloud data. The display apparatus 220 may be a display apparatus of any one of a plurality of types. For example, the display apparatus 220 may be a liquid crystal display (LCD), a plasma display, an organic light-emitting diode (OLED) display, or another type of display apparatus.

Although not shown in FIG. 1, in some aspects, the encoder 100 and the decoder 200 may be respectively integrated with an audio encoder and an audio decoder, and may include an appropriate multiplexer-demultiplexer (MUX-DEMUX) unit or other hardware and software for encoding or decoding both audio and videos in a shared data stream or separate data streams. In some embodiments, if applicable, the MUX-DEMUX unit may comply with the ITU H.223 multiplexer protocol or another protocol such as a user datagram protocol (UDP).

The encoder 100 and the decoder 200 may each be any one of the following circuits: one or more microprocessors, a digital signal processor (DSP), an application-specific integrated circuit (ASIC), a field-programmable gate array (FPGA), discrete logic, hardware, or any combination thereof. If this application is partially implemented by software, the apparatus may store an instruction used for software in a suitable non-volatile computer readable storage medium, and may use one or more processors to execute the instruction in hardware to implement the technologies in this application. Any of the foregoing content (including hardware, software, and a combination of hardware and software) may be considered as one or more processors. Each of the encoder 100 and the decoder 200 may be included in one or more encoders or decoders, and any one of the encoders or the decoders may be integrated as a part of a combined encoder/decoder (codec) in a corresponding apparatus.

In this application, the encoder 100 may be generally referred to as "signaling" or "sending" some information to another apparatus, for example, the decoder 200. The term "signaling" or "sending" may generally refer to transmission of a syntax element used to decode compressed point cloud data and/or other data. Such transmission may occur in real time or almost real time. Alternatively, such communication may occur after a period of time, for example, may occur when a syntax element in an encoded bitstream is stored in a computer readable storage medium during encoding, and the decoding apparatus may then retrieve the syntax element at any time after the syntax element is stored in the medium.

Figure 2:
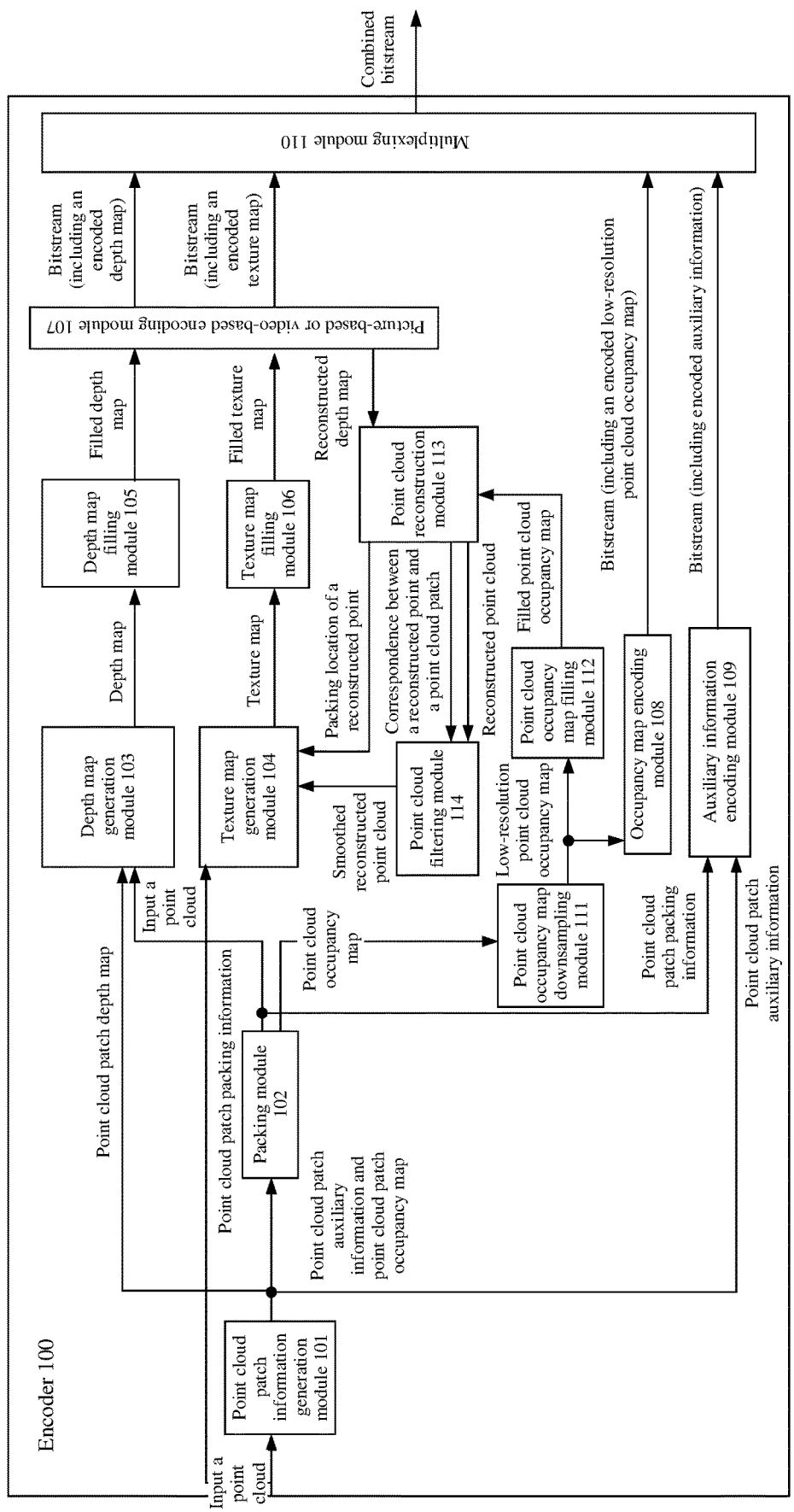
FIG. 2 is a schematic block diagram of an encoder applicable to an embodiment of this application.

FIG. 2 is a schematic block diagram of an encoder 100 according to an embodiment of this application. FIG. 2 is described by using an example of an MPEG (moving picture expert group) point cloud compression (PCC) encoding framework. Referring to FIG. 2, the encoder 100 may include a point cloud patch information generation module 101, a packing module 102, a depth map generation module 103, a texture map generation module 104, a depth map filling module 105, a texture map filling module 106, a picture-based or video-based encoding module 107, an occupancy map encoding module 108, an auxiliary information encoding module 109, a multiplexing module 110, a point cloud occupancy map downsampling module 111, a point cloud occupancy map filling module 112, a point cloud reconstruction module 113, and a point cloud filtering module 114.

The point cloud patch information generation module 101 may receive one or more point cloud groups sent by a data source 120. Each point cloud group may include one frame of point cloud or a plurality of frames of point clouds. For ease of description, a current point cloud frame in a current point cloud group is used as an example for description in the following. The point cloud patch information generation module 101 may determine three-dimensional coordinates of each point included in the current point cloud frame in a three-dimensional space coordinate system and a normal direction vector of each point in a three-dimensional space, and divide the current point cloud frame into a plurality of patches based on the determined normal direction vector of each point in the three-dimensional space and a predefined projection plane. Each patch includes one or more points in the current point cloud frame. The point cloud patch information generation module 101 may further determine an occupancy map of each patch and a depth map of each patch.

The point cloud patch information generation module 101 may further determine three-dimensional information of each patch and normal coordinate axis information of each patch. The information may be used as auxiliary information of each patch. In addition, the point cloud patch information generation module 101 may classify patches into three types: a first-type patch, a second-type patch, and a third-type patch respectively. A first index is used to indicate a type of each patch. The point cloud patch information generation module 101 may send a first index of each patch in the current point cloud frame and the auxiliary information of each patch to the auxiliary information encoding module 109 for encoding, which may also be referred to as compression encoding. The three-dimensional information of each patch may include a shift of the to-be-encoded patch in the 3D space along a tangent direction, a shift of the to-be-encoded patch in the 3D space along a bitangent direction, and a shift of the to-be-encoded patch in the 3D space along a normal direction. The point cloud patch information generation module 101 may further send the occupancy map of each patch and the auxiliary information of each patch to the packing module 102. In addition, the point cloud patch information generation module 101 may further send the depth map of each patch to the depth map generation module 103.

The packing module 102 may pack the received occupancy map of each patch and auxiliary information of each patch that are sent by the point cloud patch information generation module 101, to obtain an occupancy map of the current point cloud frame. Specifically, the packing module 102 may arrange occupancy maps of all patches in a specific order, for example, in descending order (or ascending order) of widths/heights of the occupancy maps of all the patches, and then sequentially insert the occupancy maps of all the patches into an available area of the occupancy map of the current point cloud frame based on an order of the arranged occupancy maps of all the patches, to obtain the occupancy map of the current point cloud frame and packing information of the patch. The packing module 102 may send the occupancy map of the current point cloud frame and the packing information of the patch to the auxiliary information encoding module 109 for compression encoding. The packing information of the patch may include two-dimensional information of each patch in the occupancy map of the current point cloud frame, index information of a reference patch of each patch, rotation transformation information of each patch, and an index of a reference frame of the current point cloud frame. The two-dimensional information of each patch in the occupancy map of the current point cloud frame may be referred to as two-dimensional information of each patch. The two-dimensional information of each patch may include a shift of the patch in the occupancy map of the current point cloud frame along a u-axis direction, a shift of the patch in the occupancy map of the current point cloud frame along a v-axis direction, a width of the patch in the occupancy map of the current point cloud frame, and a height of the patch in the occupancy map of the current point cloud frame. In addition, the packing module 102 may further send the packing information of the patch to the depth map generation module 103 and the point cloud occupancy map downsampling module 111.

Figure 3:
FIG. 3 is a schematic diagram of a point cloud applicable to an embodiment of this application.
Figure 4:
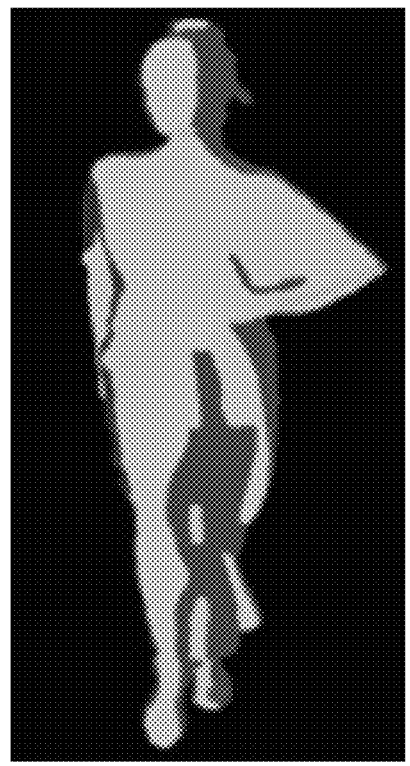
FIG. 4 is a schematic diagram of a patch of a point cloud applicable to an embodiment of this application.
Figure 5:
FIG. 5 is a schematic diagram of an occupancy map of a point cloud applicable to an embodiment of this application.

It should be noted that, to more intuitively understand the point cloud, the patch of the point cloud, and the occupancy map of the point cloud involved in the technologies in this application, refer to FIG. 3, FIG. 4, and FIG. 5. FIG. 3 is a schematic diagram of a frame of point cloud applicable to an embodiment of this application; FIG. 4 is a schematic diagram of a patch of the frame of point cloud; and FIG. 5 is a schematic diagram of an occupancy map of the frame of point cloud obtained by the packing module 102 by packing an occupancy map of each patch of the frame of point cloud shown in FIG. 4. The point cloud shown in FIG. 3 may be the current point cloud frame in this embodiment of this application. The patch of the point cloud shown in FIG. 4 may be a patch of the current point cloud frame in this embodiment of this application. The occupancy map of the point cloud shown in FIG. 5 may be the occupancy map of the current point cloud frame in this embodiment of this application.

After receiving the occupancy map of the current point cloud frame and the packing information of the patch that are sent by the packing module 102, and the first index of each patch and the auxiliary information of each patch that are sent by the point cloud patch information generation module 101, the auxiliary information encoding module 109 may encode the current point cloud frame and each patch included in the current point cloud frame to obtain a bitstream including encoded auxiliary information, and then send the obtained bitstream including the encoded auxiliary information to the multiplexing module 110. The two-dimensional information of each patch and the index information of the reference patch of each patch in the packing information of the patch may also be referred to as the auxiliary information of each patch.

After receiving the packing information of the patch sent by the packing module 102 and the depth map of each patch sent by the point cloud patch information generation module 101, the depth map generation module 103 may generate a depth map of the current point cloud frame based on the packing information of each patch and the depth map of each patch; and then, send the generated depth map of the current point cloud frame to the depth map filling module 105, so as to fill an empty pixel in the depth map of the current point cloud frame to obtain a filled depth map of the current point cloud frame. The depth map filling module 105 may send the obtained filled depth map of the current point cloud frame to the picture-based or video-based encoding module 107, so as to perform picture-based or video-based encoding on the filled depth map of the current point cloud frame to obtain a reconstructed depth map of the current point cloud and a bitstream including an encoded depth map of the current point cloud frame, and may send the obtained reconstructed depth map of the current point cloud frame to the point cloud reconstruction module 113, and send the bitstream including the encoded depth map of the current point cloud frame to the multiplexing module 110.

The point cloud occupancy map downsampling module 111 may perform downsampling processing on the received occupancy map of the current point cloud frame sent by the packing module 102, to obtain a low-resolution occupancy map of the current point cloud frame. Then, the point cloud occupancy map downsampling module 111 may further send the low-resolution occupancy map of the current point cloud frame to the occupancy map encoding module 108 and the point cloud occupancy map filling module 112. The occupancy map encoding module 108 may encode the received low-resolution occupancy map of the current point cloud frame to obtain a bitstream including an encoded low-resolution occupancy map of the current point cloud frame, and the occupancy map encoding module 108 may further send the bitstream including the encoded low-resolution occupancy map of the current point cloud frame to the multiplexing module 110. The point cloud occupancy map filling module 112 fills an original-resolution occupancy map of the current point cloud frame based on the received low-resolution occupancy map of the current point cloud frame, to obtain a filled occupancy map of the current point cloud frame, where the filled occupancy map of the current point cloud frame has an original resolution.

The point cloud reconstruction module 113 may reconstruct a geometry of the current point cloud frame based on the received filled occupancy map of the current point cloud frame sent by the point cloud occupancy map filling module 112, the reconstructed depth map of the current point cloud frame sent by the picture-based or video-based encoding module 107, the packing information of the patch, and the auxiliary information of the patch, so as to output a reconstructed point cloud. In addition, the point cloud reconstruction module 113 may further output a correspondence between a reconstructed point in the reconstructed point cloud and a patch, and a packing location of the reconstructed point in the reconstructed point cloud. The point cloud reconstruction module 113 may send the reconstructed point cloud and the correspondence between a reconstructed point in the reconstructed point cloud and a patch to the point cloud filtering module 114, and the point cloud reconstruction module 113 may further send the packing location of the reconstructed point in the reconstructed point cloud to the texture map generation module 104.

After receiving the reconstructed point cloud and the correspondence between a reconstructed point in the reconstructed point cloud and a patch that are sent by the point cloud reconstruction module 113, the point cloud filtering module 114 may filter the reconstructed point cloud. Specifically, defects such as an obvious noise point and a seam in the reconstructed point cloud may be removed to obtain a filtered reconstructed point cloud, which may also be referred to as a smoothed reconstructed point cloud. Alternatively, the point cloud filtering module 114 may perform smoothing processing on the reconstructed point cloud.

After receiving the smoothed reconstructed point cloud sent by the point cloud filtering module 114, the packing location of the reconstructed point in the reconstructed point cloud sent by the point cloud reconstruction module 113, and the current point cloud frame sent by the data source 120, the texture map generation module 104 may generate a texture map of the current point cloud frame based on the smoothed reconstructed point cloud, the packing location of the reconstructed point in the reconstructed point cloud, and the current point cloud frame, and may send the generated texture map of the current point cloud frame to the texture map filling module 106, so as to fill an empty pixel in the texture map of the current point cloud frame to obtain a filled texture map of the current point cloud frame. The texture map filling module 106 may send the obtained filled texture map of the current point cloud frame to the picture-based or video-based encoding module 107, so as to perform picture-based or video-based encoding on the filled texture map of the current point cloud frame to obtain a bitstream including a reconstructed texture map of the current point cloud frame. The picture-based or video-based encoding module 107 may further send the obtained bitstream including the reconstructed texture map of the current point cloud frame to the multiplexing module 110.

Based on the foregoing description, the picture-based or video-based encoding module 107, the occupancy map encoding module 108, and the auxiliary information encoding module 109 may send the obtained bitstreams to the multiplexing module 110, and the multiplexing module 110 may combine these received bitstreams into a combined bitstream, and send the combined bitstream to an output interface 140. The output interface 140 may send the combined bitstream to a decoder 200.

It should be understood that the encoder 100 shown in FIG. 2 is merely an embodiment of this application. In a specific implementation, the encoder 100 may include more or fewer modules than the modules shown in FIG. 2. This is not specifically limited in this embodiment of this application.

Figure 6:
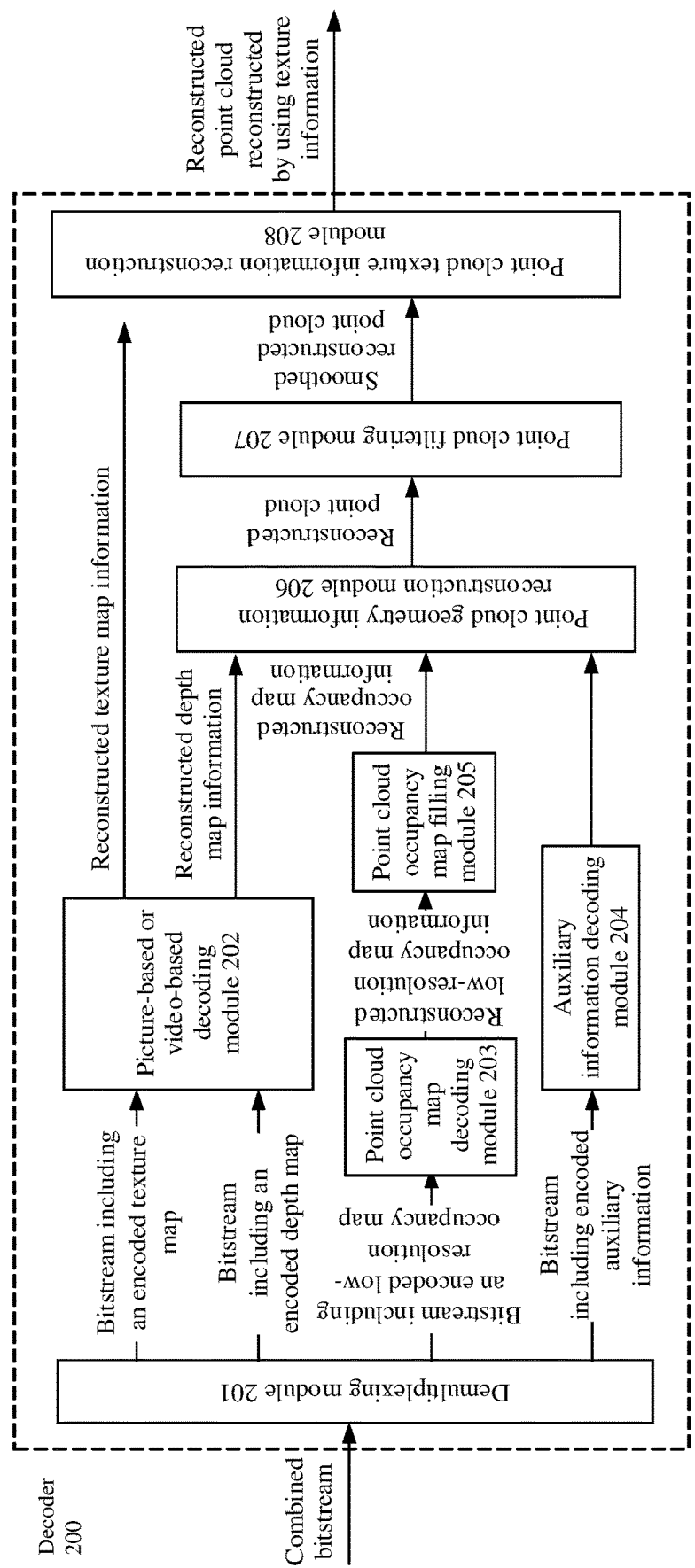
FIG. 6 is a schematic block diagram of a decoder applicable to an embodiment of this application.

FIG. 6 is a schematic block diagram of a decoder 200 according to an embodiment of this application. FIG. 6 is described by using an example of an MPEG PCC decoding framework. Referring to FIG. 6, the decoder 200 may include a demultiplexing module 201, a picture-based or video-based decoding module 202, an occupancy map decoding module 203, an auxiliary information decoding module 204, a point cloud occupancy map filling module 205, a point cloud geometry information reconstruction module 206, a point cloud filtering module 207, and a point cloud texture information reconstruction module 208.

The demultiplexing module 201 may receive, through an input interface 240, a combined bitstream sent by an output interface 140 of an encoder 100, and send the combined bitstream to a corresponding decoding module. Specifically, the demultiplexing module 201 sends a bitstream including an encoded texture map of a current point cloud frame and a bitstream including an encoded depth map of the current point cloud frame to the picture-based or video-based decoding module 202, sends a bitstream including an encoded low-resolution occupancy map of the current point cloud frame to the occupancy map decoding module 203, and sends a bitstream including encoded auxiliary information to the auxiliary information decoding module 204.

The picture-based or video-based decoding module 202 may decode the received bitstream including the encoded texture map of the current point cloud frame and the bitstream including the encoded depth map of the current point cloud frame to obtain reconstructed texture map information of the current point cloud frame and reconstructed depth map information of the current point cloud frame, and may send the reconstructed texture map information of the current point cloud frame to the point cloud texture information reconstruction module 208, and send the reconstructed depth map information of the current point cloud frame to the point cloud geometry information reconstruction module 206. The occupancy map decoding module 203 may decode the received bitstream including the encoded low-resolution occupancy map of the current point cloud frame to obtain reconstructed low-resolution occupancy map information of the current point cloud frame, and send the reconstructed low-resolution occupancy map information of the current point cloud frame to the point cloud occupancy map filling module 205. The point cloud occupancy map filling module 205 may obtain reconstructed original-resolution occupancy map information of the current point cloud frame based on the reconstructed low-resolution occupancy map information of the current point cloud frame, and then send the reconstructed original-resolution occupancy map information of the current point cloud frame to the point cloud geometry information reconstruction module 206. For ease of description, the reconstructed original-resolution occupancy map information of the current point cloud frame is subsequently collectively referred to as reconstructed occupancy map information of the current point cloud frame.

The auxiliary information decoding module 204 may decode the received bitstream including the encoded auxiliary information to obtain auxiliary information, and may send the auxiliary information to the point cloud geometry information reconstruction module 206. A specific decoding method is described in a subsequent embodiment.

The point cloud geometry information reconstruction module 206 may reconstruct a geometry of the current point cloud frame based on the received reconstructed depth map information of the current point cloud frame sent by the picture-based or video-based decoding module 202, the reconstructed occupancy map information of the current point cloud frame sent by the point cloud occupancy map filling module 205, and the auxiliary information sent by the auxiliary information decoding module 204, so as to obtain a reconstructed point cloud. The reconstructed point cloud is similar to the reconstructed point cloud obtained by a point cloud reconstruction module 113 in the encoder 100. For a specific reconstruction process, refer to a reconstruction process of the point cloud reconstruction module 113 in the encoder 100. The point cloud geometry information reconstruction module 206 may further send the reconstructed point cloud to the point cloud filtering module 207. The point cloud filtering module 207 may filter the reconstructed point cloud based on the received reconstructed point cloud to obtain a smoothed reconstructed point cloud. For a specific filtering process, refer to a filtering process of a point cloud filtering module 114 in the encoder 100. The point cloud filtering module 207 may send the smoothed reconstructed point cloud to the point cloud texture information reconstruction module 208. After receiving the smoothed reconstructed point cloud sent by the point cloud filtering module 207 and the reconstructed texture map information of the current point cloud frame sent by the picture-based or video-based decoding module 202, the point cloud texture information reconstruction module 208 may reconstruct texture information of the reconstructed point cloud to obtain the reconstructed point cloud with reconstructed texture information.

It should be understood that the decoder 200 shown in FIG. 6 is merely an example. In specific implementation, the decoder 200 may include more or fewer modules than those shown in FIG. 6. This is not limited in embodiments of this application.

For ease of understanding, the following first describes technical terms involved in the embodiments of this application.

Figure 7:
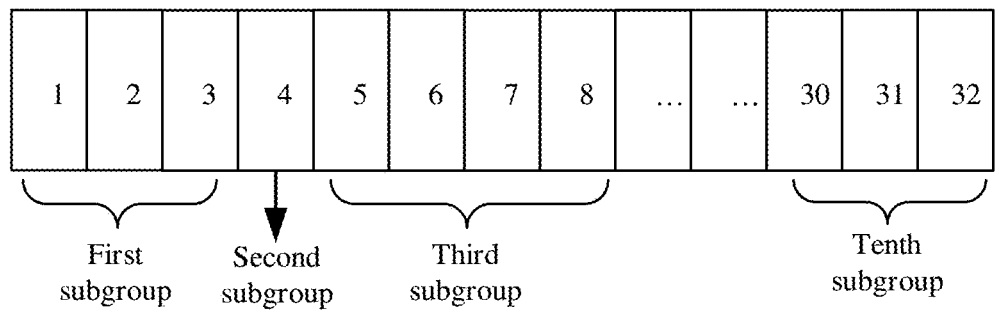
FIG. 7 is a schematic diagram of a group of frames applicable to an embodiment of this application.

In an example, a current point cloud group may be a group of frames (GOF), and one group of frames may include 32 frames of point clouds, in other words, the current point cloud group may include 32 frames of point clouds. Certainly, a quantity of frames of point clouds included in the current point cloud group may alternatively be another value, which is not limited in embodiments of this application. In an example, one group of frames may be further divided into a plurality of subgroups, each subgroup may include one frame of point cloud or a plurality of frames of point clouds, and the current point cloud group may be any subgroup in the plurality of subgroups. For example, FIG. 7 is a schematic diagram of a group of frames according to an embodiment of this application. As shown in FIG. 7, one group of frames may be divided into 10 subgroups, the first subgroup includes the first, second, and third frames of point clouds, the second subgroup includes the fourth frame of point cloud, the third subgroup includes the fifth, sixth, seventh, and eighth frames of point clouds, . . . , and the tenth subgroup includes the 30th, 31st, and 32nd frames of point clouds. The current point cloud group may be any subgroup of the 10 subgroups. In FIG. 7, only point clouds included in the first subgroup, the second subgroup, the third subgroup, and the tenth subgroup are represented as an example, and point clouds included in other subgroups are not specifically described. In conclusion, the current point cloud group may be a group of frames, or the current point cloud group may be a subgroup in a group of frames. Certainly, the current point cloud group may be a point cloud group of another form, such as a customized point cloud group. This is not limited in embodiments of this application.

Based on the foregoing description, patches may be classified into three types: a first-type patch, a second-type patch, and a third-type patch. For example, the patches may also be classified into a global matched patch (SKIP_patch), a local matched patch (local_patch), and an unmatched patch (I_INTRA or P_INTRA) based on matching statuses of the patches in the current point cloud group. In other words, the first-type patch may be a global matched patch, the second-type patch may be a local matched patch, and the third-type patch may be an unmatched patch. For ease of description, a to-be-encoded patch is used as an example to describe the three types of patches. It should be understood that the to-be-encoded patch is any patch in a current point cloud frame, and the current point cloud frame is any frame of point cloud in a current point cloud group. If the to-be-encoded patch is a first-type patch, a patch that has a matching relationship with the to-be-encoded patch exists in all point cloud frames in the current point cloud group, and the to-be-encoded patch may be referred to as a global matched patch. If the to-be-encoded patch is a second-type patch, a patch that has a matching relationship with the to-be-encoded patch exists in a reference frame of the current point cloud frame, but a patch that has a matching relationship with the to-be-encoded patch exists only in some point cloud frames in the current point cloud group, and the to-be-encoded patch may be referred to as a local matched patch. If the to-be-encoded patch is a third-type patch, no patch that has a matching relationship with the to-be-encoded patch exists in any point cloud frame in the current point cloud group, and the to-be-encoded patch may be referred to as an unmatched patch.

Figure 8:
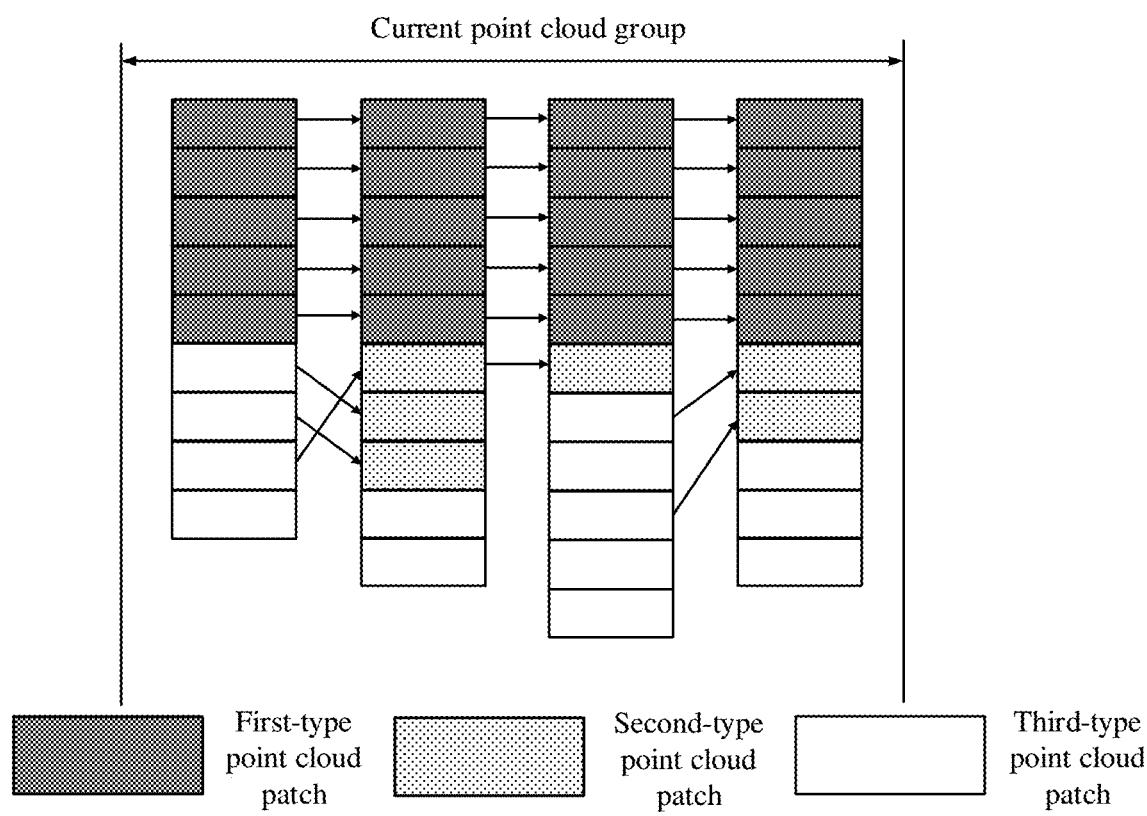
FIG. 8 is a schematic diagram of a first current point cloud group according to an embodiment of this application.

In a possible implementation, referring to FIG. 8, the reference frame of the current point cloud frame may be located in the current point cloud group. For example, the reference frame of the current point cloud frame may be a previous frame of point cloud of the current point cloud frame. In addition, patches included in all point clouds in the current point cloud group may be sequentially arranged in an order of the first-type patch, the second-type patch, and the third-type patch. A quantity of first-type patches in each frame of point cloud is the same in the current point cloud group, and when the quantity of first-type patches is greater than 1, the first-type patches in each frame of point cloud in the current point cloud group may be sequentially arranged based on a same order, in other words, there is a matching relationship between first-type patches at same locations in all frames of point clouds. For example, the wth first-type patches in all the frames of point clouds have a matching relationship with each other, and w is less than or equal to the quantity of first-type patches.

Generally, two-dimensional information, rotation transformation information, and normal coordinate axis information of first-type patches in an occupancy map of the current point cloud frame are the same, but three-dimensional information thereof is different. However, in some cases, the two-dimensional information of the first-type patches may alternatively be different, or the three-dimensional information thereof may alternatively be the same. In other words, the rotation transformation information and the normal coordinate axis information of the first-type patches may be the same, and the two-dimensional information and the three-dimensional information thereof may be the same or may be different. As such, there may be three cases for the two-dimensional information and the three-dimensional information. For ease of description, next, a to-be-encoded patch is used as an example for description. In a first possible case, when the to-be-encoded patch is a first-type patch, two-dimensional information of a reference patch of the to-be-encoded patch is the same as two-dimensional information of the to-be-encoded patch, and three-dimensional information of the reference patch of the to-be-encoded patch is the same as three-dimensional information of the to-be-encoded patch. In a second possible case, when the to-be-encoded patch is a first-type patch, two-dimensional information of a reference patch of the to-be-encoded patch is the same as two-dimensional information of the to-be-encoded patch, and three-dimensional information of the reference patch of the to-be-encoded patch is different from three-dimensional information of the to-be-encoded patch. In a third possible case, when the to-be-encoded patch is a first-type patch, two-dimensional information of a reference patch of the to-be-encoded patch is different from two-dimensional information of the to-be-encoded patch, and three-dimensional information of the reference patch of the to-be-encoded patch is different from three-dimensional information of the to-be-encoded patch.

When patches included in all point clouds in a current point cloud group are arranged in the manner shown in FIG. 8, a reference patch of a to-be-encoded patch may be a patch at a same location in a reference frame of a current point cloud frame in which the to-be-decoded patch is located. For example, if the to-be-decoded patch is at the third location in the current point cloud frame, the third patch in the reference frame of the current point cloud frame is the reference patch of the to-be-decoded patch.

The rotation transformation information may be rotation angle information, coordinate axis transformation information, or image transformation information. The rotation angle information includes a specific rotation angle value or rotation angle index. For example, if a rotation angle value of the to-be-encoded patch is 0, it indicates that the to-be-encoded patch does not rotate. If the rotation angle value of the to-be-encoded patch is 20, it indicates that the to-be-encoded patch rotates by 20°. If the rotation angle value of the to-be-encoded patch is 80, it indicates that the to-be-encoded patch rotates by 80°. For another example, if a rotation angle index of the to-be-encoded patch is 0, it indicates that the to-be-encoded patch does not rotate. If the rotation angle index of the to-be-encoded patch is 1, it indicates that the to-be-encoded patch rotates by 15°. If the rotation angle index of the to-be-encoded patch is 2, it indicates that the to-be-encoded patch rotates by 30°. If the rotation angle index of the to-be-encoded patch is 3, it indicates that the to-be-encoded patch rotates by 45°. The rotation angle information may alternatively be represented in another form, which is not specifically limited herein. For example, a matrix form may alternatively be used for description. Especially, when acceleration processing is performed in a GPU (Graphic Processing Unit), a processing speed is increased by using the matrix form.

It should be noted that rotation of the to-be-encoded patch may be clockwise rotation, or may be counterclockwise rotation.

If the rotation transformation information is the coordinate axis swap information, the coordinate axis swap information may be represented as a coordinate axis swap flag. For example, when the coordinate axis swap flag is false or 0, it indicates that a tangent coordinate axis of the to-be-encoded patch and a bitangent coordinate axis of the to-be-encoded patch are not swapped. For example, when the coordinate axis swap flag is true or 1, the tangent coordinate axis of the to-be-encoded patch and the bitangent coordinate axis of the to-be-encoded patch are swapped. For example, a coordinate axis index of the to-be-encoded patch may be 0, 1, or 2. It is assumed that an index of an X-axis is 0, an index of a Y-axis is 1, and an index of a Z-axis is 2. Then, a tangent coordinate axis index of the to-be-encoded patch and a bitangent coordinate axis index of the to-be-encoded patch may be any two of 0, 1, and 2. Generally, a tangent coordinate axis of a patch may be referred to as a U-axis, and a bitangent coordinate axis of the patch may be referred to as a V-axis. It is assumed that in a case, an obtained tangent coordinate axis index of the current patch and an obtained bitangent coordinate axis index of the to-be-encoded patch are respectively 0 and 2. If the coordinate axis swap flag is false or 0, the tangent coordinate axis index of the to-be-encoded patch and the bitangent coordinate axis index of the to-be-encoded patch are not swapped. If the coordinate axis swap flag is true or 1, the tangent coordinate axis index of the to-be-encoded patch and the bitangent coordinate axis index of the to-be-encoded patch are swapped, in other words, the tangent coordinate axis index of the to-be-encoded patch is updated to 2, and the bitangent coordinate axis index of the to-be-encoded patch is updated to 0.

Next, a first point cloud encoding method provided in an embodiment of this application is described. It should be noted that, with reference to the point cloud coding system shown in FIG. 1 and the schematic block diagram of the encoder 100 shown in FIG. 2, any point cloud encoding method in the following may be performed by the encoder 100 in the point cloud coding system, and more specifically, may be performed by the auxiliary information encoding module 109 in the encoder 100.

Figure 9:
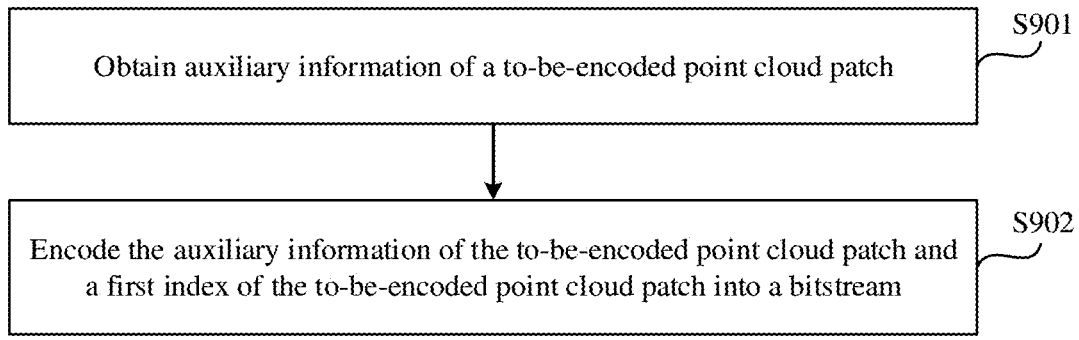
FIG. 9 is a flowchart of a first point cloud encoding method according to an embodiment of this application.

FIG. 9 is a flowchart of a point cloud encoding method according to an embodiment of this application. The method is applied to a point cloud coding system. Referring to FIG. 9, the method includes the following steps.

S901. Obtain auxiliary information of a to-be-encoded patch.

It should be noted that the to-be-encoded patch may be any patch included in a to-be-encoded current point cloud frame.

S902. Encode the auxiliary information of the to-be-encoded patch and a first index of the to-be-encoded patch into a bitstream.

The first index may indicate a type of the to-be-encoded patch. A syntax element of the first index may be patch_mode, patch_type, or the like. When values of the first index are different, types of the to-be-encoded patch are different.

When the first index is a first value, it may indicate that the to-be-encoded patch is a first-type patch, and the auxiliary information of the to-be-encoded patch encoded into the bitstream includes three-dimensional information but does not include two-dimensional information, rotation transformation information, and normal coordinate axis information; and/or when the first index is a second value, it may indicate that the to-be-encoded patch is a second-type patch, and the auxiliary information of the to-be-encoded patch encoded into the bitstream includes two-dimensional information, three-dimensional information, and index information of a reference patch of the to-be-encoded patch, but does not include rotation transformation information and normal coordinate axis information; and/or when the first index is a third value, it may indicate that the to-be-encoded patch is a third-type patch, and the auxiliary information of the to-be-encoded patch encoded into the bitstream includes two-dimensional information, three-dimensional information, rotation transformation information, and normal coordinate axis information.

Generally, a patch that has a matching relationship with the first-type patch exists in all point clouds in a current point cloud group, and two-dimensional information, rotation transformation information, and normal coordinate axis information of first-type patches in the current point cloud group are the same, but three-dimensional information thereof may be different. A patch that has a matching relationship with the second-type patch exists in a reference frame of a current point cloud frame, and rotation transformation information and normal coordinate axis information of the second-type patch and the reference patch of the second-type patch are the same, but two-dimensional information and three-dimensional information thereof may be different. No patch that has a matching relationship with the third-type patch exists in the reference frame of the current point cloud frame. Therefore, to reduce bit overheads of the bitstream and further improve encoding efficiency, when the first index is the first value, the auxiliary information of the to-be-encoded patch may include the three-dimensional information but does not include the two-dimensional information, the rotation transformation information, and the normal coordinate axis information. When the first index is the second value, the auxiliary information of the to-be-encoded patch may include the two-dimensional information, the three-dimensional information, and the index information of the reference patch of the to-be-encoded patch, but does not include the rotation transformation information and the normal coordinate axis information. When the first index is the third value, the auxiliary information of the to-be-encoded patch may include the two-dimensional information, the three-dimensional information, the rotation transformation information, and the normal coordinate axis information.

It should be noted that the three-dimensional information of the to-be-encoded patch may include a shift of the to-be-encoded patch in a 3D space along a tangent direction (3d_shift_tangent_axis), a shift of the to-be-encoded patch in the 3D space along a bitangent direction (3d_shift_bitangent_axis), and a shift of the to-be-encoded patch in the 3D space along a normal direction (3d_shift_normal_axis). The two-dimensional information of the to-be-encoded patch may include a shift of the to-be-encoded patch in an occupancy map of the current point cloud frame along a u-axis direction (2d_shift_u), a shift of the to-be-encoded patch in the occupancy map of the current point cloud frame along a v-axis direction (2d_shift_v), a width of the to-be-encoded patch in the occupancy map of the current point cloud frame (2d_size_u), and a height of the to-be-encoded patch in the occupancy map of the current point cloud frame (2d_size_v). In addition, a syntax element of the reference patch of the to-be-encoded patch may be patchIndex, used to indicate the index information of the reference patch. The syntax element may further include index information of a reference frame in which the reference patch is located: frameIndex. A syntax element of the rotation transformation information of the to-be-encoded patch may be rotation. In addition, the index information of the reference patch of the to-be-encoded patch may be used to indicate the reference patch of the to-be-encoded patch. The normal coordinate axis information may be a normal axis index of the to-be-encoded patch, for example, a normal axis index normalAxis may be 0, 1, or 2 for an X-axis, a Y-axis, or a Z-axis, respectively.

For example, when the first index is the first value, the three-dimensional information of the to-be-encoded patch may be encoded into the bitstream based on three-dimensional information of the reference patch of the to-be-encoded patch. Specifically, the three-dimensional information of the to-be-encoded patch may be encoded into the bitstream in a differential encoding scheme, or may be directly encoded into the bitstream. A specific encoding scheme is not limited. The first index of the to-be-encoded patch is encoded into the bitstream in a fixed-length encoding scheme. When the first index is the second value, the two-dimensional information and the three-dimensional information of the to-be-encoded patch may be encoded into the bitstream based on two-dimensional information and three-dimensional information of the reference patch of the to-be-encoded patch. Specifically, the two-dimensional information and the three-dimensional information of the to-be-encoded patch may be encoded into the bitstream in the differential encoding scheme, or the two-dimensional information and the three-dimensional information of the to-be-encoded patch may be encoded into the bitstream in a more accurate prediction differential scheme. A specific encoding scheme is not limited. The index information of the reference patch and the first index of the to-be-encoded patch are encoded into the bitstream in the fixed-length encoding scheme. When the first index is the third value, the two-dimensional information, the three-dimensional information, the rotation transformation information, the normal coordinate axis information, and the first index of the to-be-encoded patch may be encoded into the bitstream in the fixed-length encoding scheme.

Encoding the three-dimensional information of the to-be-encoded patch into the bitstream in the differential encoding scheme means encoding a difference between the three-dimensional information of the to-be-encoded patch and the three-dimensional information of the reference patch of the to-be-decoded patch into the bitstream. Encoding the two-dimensional information and the three-dimensional information of the to-be-encoded patch into the bitstream in the differential encoding scheme means encoding a difference between the two-dimensional information of the to-be-encoded patch and the two-dimensional information of the reference patch of the to-be-decoded patch, and a difference between the three-dimensional information of the to-be-encoded patch and the three-dimensional information of the reference patch of the to-be-decoded patch into the bitstream.

In an implementation, first indexes of a plurality of patches in the current point cloud frame may be packed together and encoded into the bitstream. For example, first indexes of all patches in the current point cloud frame may be packed together and encoded into the bitstream. In another implementation, first indexes of all patches in the current point cloud frame may be separately packed and encoded into the bitstream. For example, a first index of a to-be-encoded patch [i−1] and auxiliary information of the to-be-encoded patch [i−1], a first index of a to-be-encoded patch [i] and auxiliary information of the to-be-encoded patch [i], and a first index of a to-be-encoded patch [i+1] and auxiliary information of the to-be-encoded patch [i+1] may be sequentially encoded into the bitstream. In other words, for the current point cloud frame, the first indexes of all the patches in the current point cloud frame may be separately packed and encoded into the bitstream, or may be packed together and encoded into the bitstream.

The first value, the second value, and the third value may be binary numbers 10, 11, and 00 respectively, or the first value, the second value, and the third value may be binary numbers 11, 10, and 00 respectively, and the reference patch of the to-be-encoded patch is included in the reference frame of the current point cloud frame. This is not limited in embodiments of this application.

For example, in this specification, when the first index of the to-be-encoded patch is the first value, partial syntax structures are shown in Table 1 and Table 2.

TABLE 1

| patch_information_data (frmIdx, p, patch_mode) ( ) { | Descriptor |
|---|---|
| if(patch_mode = = P_SKIP ) { | |
| skip_patch_data_unit(frmIdx,p) | |
| } | |
| else if(patch_mode = = I_INTRA \|\| patch_mode = = P_INTRA) { | |
|   if( pfps_local_override_geometry_patch_enable_flag ) | |
|     pid_override_geometry_patch_flag[ frmIdx ][ p ] | ae(v) |
|   if( pid_override_geometry_patch_flag[ frmIdx ][ p ]) | |
|     pid_geometry_patch_parameter_set_id[ frmIdx ][ p ] | ae(v) |
|   for( i = 0; i < sps_attribute_count; i++ ) | |
|     if( pfps_local_override_attribute_patch_enable_flag[ i ] ) { | |
|       pid_override_attribute_patch_flag[ p ][ i ] | ae(v) |
|       if( pid_override_attribute_patch_flag[ p ][ i ] ) | |
|         pid_attribute_patch_parameter_set_id[ p ][ i ] | ae(v) |
|     } | |
|   patch_data_unit( frmIdx, p ) | |
| } | |
| else if( patch_mode = = P_INTER) | |
|   delta_patch_data_unit( frmIdx, p, patch_mode ) ( ) { | |
| else if( patch_mode = = I_PCM \|\| patch_mode = + P_PCM ) | |
|   pcm_patch_data_unit( frmIdx, p ) | |
| } | |

TABLE 2

| skip_patch_data_unit( frmIdx, patchIndex ) { | Descriptor |
|---|---|
|   spdu_3d_shift_tangent_axis[ frmIdx ][ patchIndex ] | ae(v) |
|   spdu_3d_shift_bitangent_axis[ frmIdx ][ patchIndex ] | ae(v) |
|   spdu_3d_shift_normal_axis[ frmIdx ][ patchIndex ] | ae(v) |
|   projectionFlag = 0 | |
|   i = 0 | |
|   while (i < sps_layer_count_minus1 + 1 && projectionFlag = = 0 ) { | |
|     projectionFlag = projectionFlag \| sps_layer_absolute_coding_enabled_flag [i ] | |
|     i++ | |
|   } | |
|   if ( projectionFlag ) | |
|     spdu_projection_mode[ frmIdx ][ patchIndex ] | ae(v) |
| } | | skip_patch_data_unit in Table 1 is information of the to-be-encoded patch encoded into the bitstream when the first index of the to-be-encoded patch is the first value, and may also be referred to as a data unit of the to-be-encoded patch.

Figure 10:
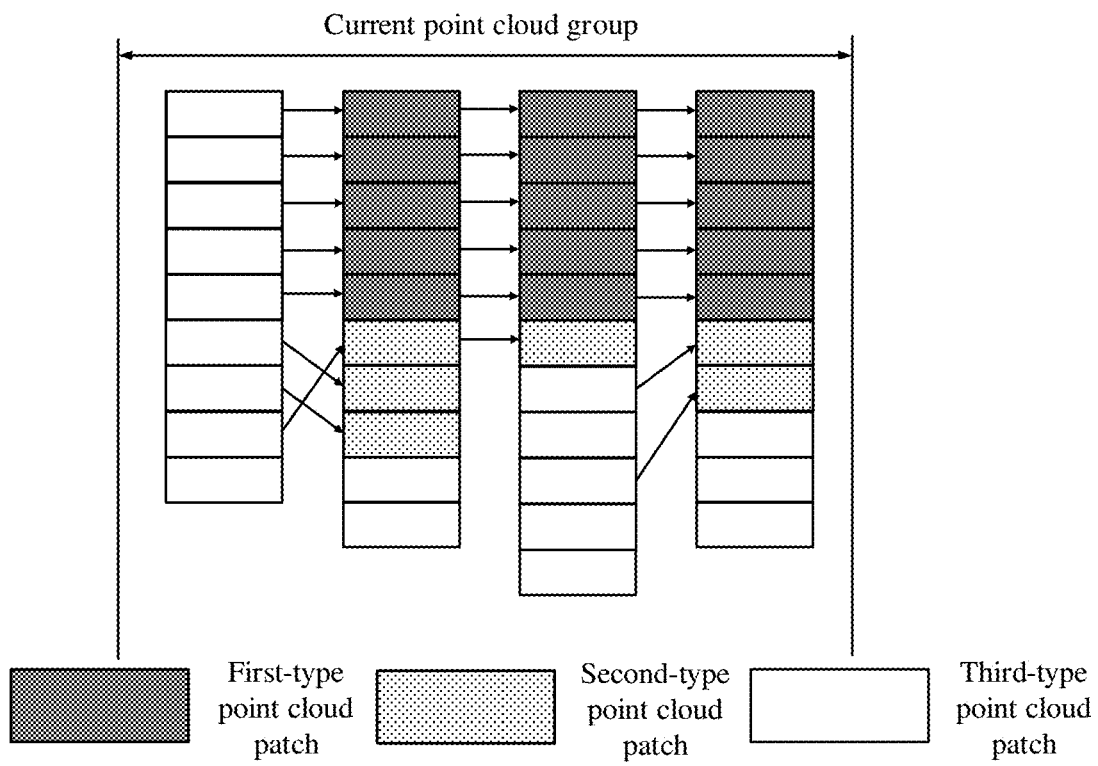
FIG. 10 is a schematic diagram of a second current point cloud group according to an embodiment of this application.

To determine whether the current point cloud frame is the first frame of point cloud in the current point cloud group during decoding, and further to distinguish the current point cloud group from another point cloud group in a decoding process, referring to FIG. 10, in this embodiment of this application, after the auxiliary information encoding module 109 receives the first frame of point cloud in the current point cloud group, first indexes of all patches included in the first frame of point cloud in the current point cloud group may be set to the third value. In this way, when the current point cloud frame is the first frame of point cloud in the current point cloud group, a first index of the first patch in the current point cloud frame is the third value. When the current point cloud frame is a non-first frame of point cloud in the current point cloud group, the first index of the first patch in the current point cloud frame is the first value. In other words, when the first index of the to-be-encoded patch is the third value, and the to-be-encoded patch is the first patch in the current point cloud frame, it may be determined that the current point cloud frame is the first frame of point cloud in the current point cloud group. In this way, a length of a point cloud frame of the current point cloud group does not need to be encoded into the bitstream, thereby improving encoding efficiency and reducing the bit overheads of the bitstream.

Based on the foregoing description, first-type patches, second-type patches, and third-type patches in each frame of point cloud may be arranged in the manner shown in FIG. 8, and then encoded in the order shown in FIG. 8 during encoding. However, in some cases, the order of the patches included in each frame of point cloud may need to be scrambled for encoding, in other words, encoding is no longer performed based on the order in FIG. 8. In this case, for ease of decoding, when the first index is the first value, the auxiliary information of the to-be-encoded patch encoded into the bitstream may further include the index information of the reference patch of the to-be-encoded patch. The index information of the reference patch is used to uniquely identify the reference patch of the to-be-encoded patch in a reference frame of the to-be-encoded patch. For example, the index information of the reference patch may be a location number of the reference patch in the reference frame.

To further reduce the bit overheads of the bitstream, when encoding is performed based on the order shown in FIG. 8, a third-type patch may be encoded in another scheme other than the foregoing encoding scheme. For example, if the to-be-encoded patch is the first third-type patch, the to-be-encoded patch may be encoded in the foregoing scheme. If the to-be-encoded patch is not the first third-type patch, the two-dimensional information and the three-dimensional information of the to-be-encoded patch may be encoded into the bitstream in the differential encoding scheme based on two-dimensional information and three-dimensional information of the first third-type patch, and other information is still encoded in the foregoing scheme. Encoding the two-dimensional information and the three-dimensional information of the to-be-encoded patch into the bitstream in the differential encoding scheme based on the two-dimensional information and the three-dimensional information of the first third-type patch means encoding a difference between the two-dimensional information of the to-be-encoded patch and the two-dimensional information of the first third-type patch, and a difference between the three-dimensional information of the to-be-encoded patch and the three-dimensional information of the first third-type patch into the bitstream.

In this embodiment of this application, the auxiliary information of the to-be-encoded patch is first obtained, and then the auxiliary information and the first index of the to-be-encoded patch are encoded into the bitstream. Values of the first index may be the first value, the second value, and the third value. Different values indicate different types of patches. Therefore, different types of patches can be distinguished by using the first index. In this way, a quantity of first-type patches does not need to be written into the bitstream, and bit overheads of the bitstream are reduced. In addition, for different types of patches, content included in auxiliary information encoded into the bitstream may be different, and for the first-type patch and the second-type patch, only a portion of auxiliary information is encoded into the bitstream. This can simplify a format of information encoded into the bitstream, reduce the bit overheads of the bitstream, and improve encoding efficiency.

Figure 11:
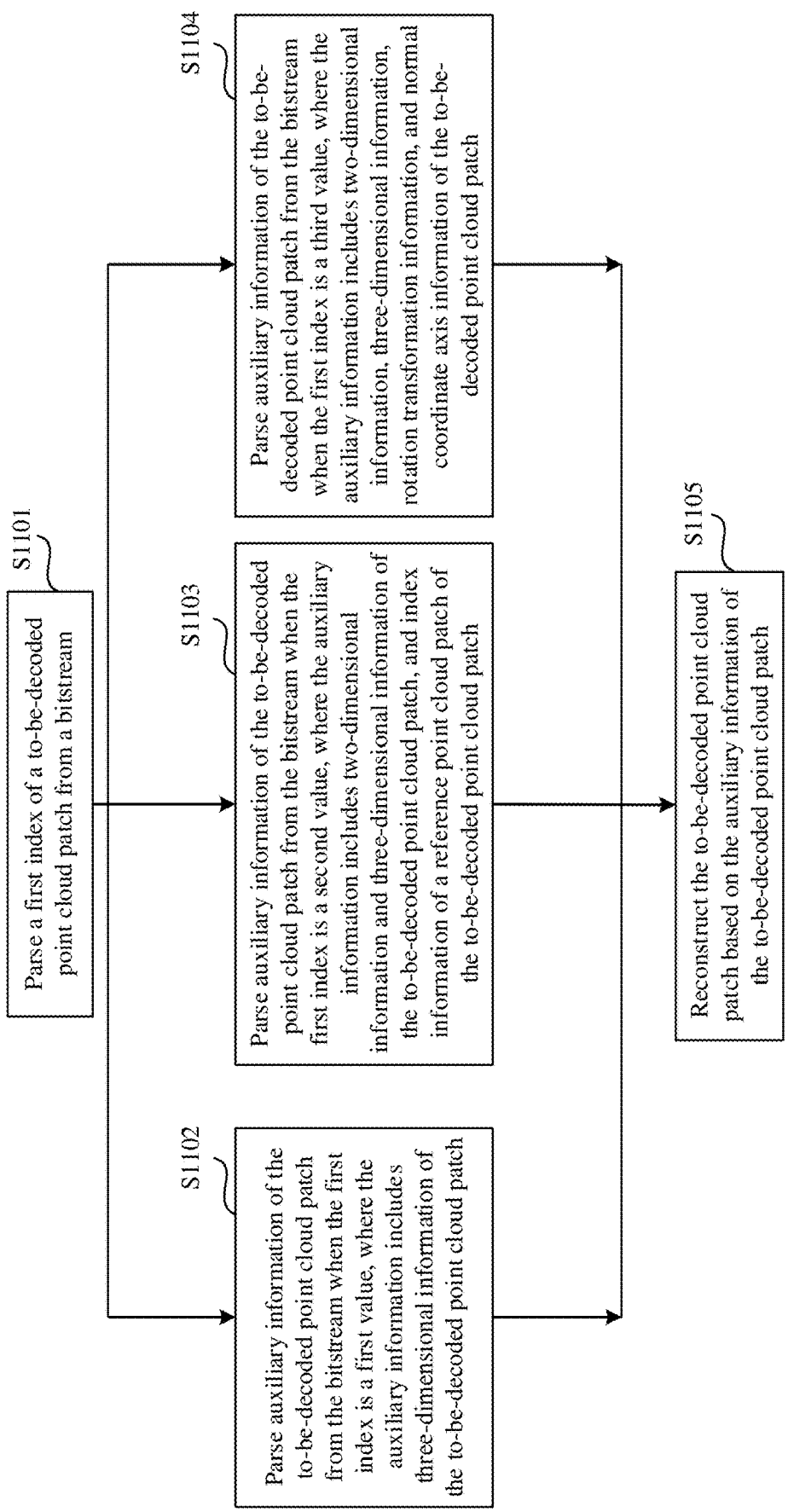
FIG. 11 is a flowchart of a first point cloud decoding method according to an embodiment of this application.

Next, a point cloud decoding method corresponding to the point cloud encoding method based on the foregoing embodiment shown in FIG. 9 is described. It should be noted that, with reference to the point cloud coding system shown in FIG. 1 and the schematic block diagram of the decoder 200 shown in FIG. 6, any point cloud decoding method in the following may be performed by the decoder 200 in the point cloud coding system, and more specifically, may be performed by the auxiliary information decoding module 204 in the decoder 200. Referring to FIG. 11, the decoding method includes the following steps.

S1101. Parse a first index of a to-be-decoded patch from a bitstream.

First indexes of all patches in a current point cloud frame may be separately packed and encoded into the bitstream, or may be packed together and encoded into the bitstream. Therefore, for a scheme in which the first indexes are separately packed and encoded into the bitstream, if the to-be-decoded patch is the first patch in the current point cloud frame, the first index of the to-be-decoded patch may be parsed from the bitstream. Certainly, for a non-first patch, the first index of the to-be-decoded patch may alternatively be parsed from the bitstream. In other words, a first index of each to-be-decoded patch in the current point cloud frame may be sequentially parsed. For example, a first index of a to-be-decoded patch [i−1] and auxiliary information of the to-be-decoded patch [i−1], a first index of a to-be-decoded patch [i] and auxiliary information of the to-be-decoded patch [i], and a first index of a to-be-decoded patch [i+1] and auxiliary information of the to-be-decoded patch [i+1] are sequentially parsed. For a scheme in which the first indexes are packed together and encoded into the bitstream, if the to-be-decoded patch is the first patch in the current point cloud frame, first indexes of a plurality of patches included in the current point cloud frame may be parsed from the bitstream, and the plurality of parsed first indexes include the first index of the to-be-decoded patch. In other words, the first indexes of the plurality of patches included in the current point cloud frame can be obtained through parsing for only once instead of a plurality of times.

For example, the first index of the to-be-decoded patch may be parsed from the bitstream by using a method matching that on an encoder side. For example, the first index of the to-be-decoded patch may be parsed from the bitstream in a fixed-length decoding scheme.

S1102. Parse auxiliary information of the to-be-decoded patch from the bitstream when the first index is a first value, where the auxiliary information includes three-dimensional information of the to-be-decoded patch.

It should be noted that when the first index is the first value, it indicates that the to-be-decoded patch is a first-type patch, in other words, the to-be-decoded patch has a matched patch in all point clouds in a current point cloud group. In this case, the auxiliary information of the to-be-decoded patch can be parsed from the bitstream, where the auxiliary information includes the three-dimensional information of the to-be-decoded patch, but does not include two-dimensional information, rotation transformation information, and normal coordinate axis information of the to-be-decoded patch.

Auxiliary information of a first-type patch encoded into a bitstream in an encoding process includes three-dimensional information, but does not include two-dimensional information, rotation transformation information, and normal coordinate axis information. Therefore, when the to-be-decoded patch is a first-type patch, the auxiliary information parsed from the bitstream includes the three-dimensional information of the to-be-decoded patch, but does not include the two-dimensional information, the rotation transformation information, and the normal coordinate axis information of the to-be-decoded patch. In this case, the two-dimensional information, the rotation transformation information, and the normal coordinate axis information of the to-be-decoded patch may be further obtained based on auxiliary information of a reference patch of the to-be-decoded patch.

For example, decoding may be performed by using a method matching that on the encoder side. For example, the three-dimensional information of the to-be-decoded patch may be parsed from the bitstream in a differential decoding scheme. For other auxiliary information of the to-be-decoded patch, for example, the two-dimensional information, the rotation transformation information, and the normal coordinate axis information of the to-be-decoded patch, two-dimensional information, rotation transformation information, and normal coordinate axis information of a patch whose location is the same as a location of the to-be-decoded patch in the current point cloud frame may be obtained from a decoded point cloud, and the obtained two-dimensional information, rotation transformation information, and normal coordinate axis information are used as the two-dimensional information, the rotation transformation information, and the normal coordinate axis information of the to-be-decoded patch. Alternatively, two-dimensional information, rotation transformation information, and normal coordinate axis information of the reference patch of the to-be-decoded patch may be obtained from a reference frame of the current point cloud frame, and the two-dimensional information, the rotation transformation information, and the normal coordinate axis information of the reference patch are used as the two-dimensional information, the rotation transformation information, and the normal coordinate axis information of the to-be-decoded patch.

When patches in a point cloud are encoded based on the arrangement manner shown in FIG. 8, the reference patch of the to-be-decoded patch may be a patch whose location in the reference frame of the current point cloud frame is the same as the location of the to-be-decoded patch in the current point cloud frame. However, based on the foregoing description, in some cases, first-type patches, second-type patches, and third-type patches in each frame of point cloud in the current point cloud group are not arranged in the manner shown in FIG. 8. In this case, when the first index is the first value, the auxiliary information of the to-be-decoded patch parsed from the bitstream may further include index information of the reference patch of the to-be-decoded patch. In this way, during decoding, when the parsed first index is the first value, the auxiliary information parsed from the bitstream may further include the index information of the reference patch of the to-be-decoded patch. Then, the reference patch of the to-be-decoded patch may be determined based on the index information of the reference patch of the to-be-decoded patch.

A manner of parsing the three-dimensional information of the to-be-decoded patch from the bitstream in the differential decoding scheme may be specifically: obtaining three-dimensional information of a patch whose location is the same as a location of the to-be-decoded patch in the current point cloud frame from a decoded point cloud, or obtaining three-dimensional information of the reference patch of the to-be-decoded patch from the reference frame of the current point cloud frame. Then, the obtained three-dimensional information is added to a difference from the three-dimensional information parsed from the bitstream, so as to obtain the three-dimensional information of the to-be-decoded patch.

S1103. Parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch.

It should be noted that when the first index is the second value, it indicates that the to-be-decoded patch is a second-type patch, in other words, a reference patch that matches the to-be-decoded patch exists in the reference frame of the current point cloud frame. In this case, the auxiliary information of the to-be-decoded patch can be parsed from the bitstream, where the auxiliary information includes the two-dimensional information, the three-dimensional information, and the index information of the reference patch of the to-be-decoded patch, but does not include the rotation transformation information and the normal coordinate axis information.

Auxiliary information of a second-type patch encoded into a bitstream in an encoding process includes two-dimensional information, three-dimensional information, and index information of a reference patch, but does not include rotation transformation information and normal coordinate axis information. Therefore, when the to-be-decoded patch is a second-type patch, the auxiliary information parsed from the bitstream includes the two-dimensional information and the three-dimensional information of the to-be-decoded patch, and the index information of the reference patch of the to-be-decoded patch, but does not include the rotation transformation information and the normal coordinate axis information of the to-be-decoded patch. In this case, the rotation transformation information and the normal coordinate axis information of the to-be-decoded patch may be further obtained based on the index information of the reference patch of the to-be-decoded patch.

The index information of the reference patch of the to-be-decoded patch may be parsed from the bitstream by using a method matching that on the encoder side, for example, may be parsed in the fixed-length decoding scheme. For the rotation transformation information and the normal coordinate axis information of the to-be-decoded patch, the reference patch of the to-be-decoded patch may be determined by using the index information of the reference patch of the to-be-decoded patch, rotation transformation information and normal coordinate axis information of the reference patch of the to-be-decoded patch are further obtained, and the rotation transformation information and the normal coordinate axis information of the reference patch are used as the rotation transformation information and the normal coordinate axis information of the to-be-decoded patch. The two-dimensional information and the three-dimensional information of the to-be-decoded patch may be decoded, for example, by using a method matching that on the encoder side, for example, the two-dimensional information and the three-dimensional information of the to-be-decoded patch may be parsed from the bitstream in the differential decoding scheme. Specifically, the reference patch of the to-be-decoded patch may be determined by using the index information of the reference patch of the to-be-decoded patch, so as to obtain two-dimensional information and three-dimensional information of the reference patch of the to-be-decoded patch. Then, the obtained two-dimensional information and three-dimensional information are respectively added to a difference from the two-dimensional information and a difference from the three-dimensional information parsed from the bitstream, so as to obtain the two-dimensional information and the three-dimensional information of the to-be-decoded patch.

S1104. Parse auxiliary information of the to-be-decoded patch from the bitstream when the first index is a third value, where the auxiliary information includes two-dimensional information, three-dimensional information, rotation transformation information, and normal coordinate axis information of the to-be-decoded patch.

It should be noted that when the first index is the third value, it indicates that the to-be-decoded patch is a third-type patch, in other words, no reference patch that matches the to-be-decoded patch exists in the current point cloud group. In this case, the two-dimensional information, the three-dimensional information, the rotation transformation information, and the normal coordinate axis information of the to-be-decoded patch can be parsed from the bitstream.

The first value, the second value, and the third value may be binary numbers 10, 11, and 00 respectively, or the first value, the second value, and the third value may be binary numbers 11, 10, and 00 respectively. This is not limited in embodiments of this application.

Based on the foregoing description, first-type patches, second-type patches, and third-type patches in each frame of point cloud in the current point cloud group may be arranged in the manner shown in FIG. 8. In this case, if the to-be-decoded patch is the first patch in the current point cloud frame, after the first index of the to-be-decoded patch is parsed from the bitstream, it may be determined, based on the value of the first index, whether the current point cloud frame is the first frame of point cloud in the current point cloud group. In other words, when the to-be-decoded patch is the first patch in the current point cloud frame, and the first index is the third value, it may be determined that the current point cloud frame is the first frame of point cloud in the current point cloud group.

However, in some cases, first-type patches, second-type patches, and third-type patches in each frame of point cloud in the current point cloud group are not arranged in the manner shown in FIG. 8, in other words, a first index of the first patch in any frame of point cloud in the current point cloud group may be the first value, the second value, or the third value. In this case, when the to-be-decoded patch is the first patch in the current point cloud frame, it cannot be determined, based on the first index parsed from the bitstream, whether the current point cloud frame is the first frame of point cloud in the current point cloud group. In this case, first indexes of a plurality of patches included in the current point cloud frame may be determined. In a possible implementation, the plurality of patches are all patches included in the current point cloud frame. If all the first indexes of the plurality of patches are the third value, it may be determined that the current point cloud frame is the first frame of point cloud in the current point cloud group.

When the first index is the third value, if auxiliary information of the first third-type patch is encoded in a fixed-length encoding scheme, two-dimensional information and three-dimensional information of a non-first third-type patch are encoded in a differential encoding scheme, and other auxiliary information is encoded in the fixed-length encoding scheme, in this step, for the non-first third-type patch, the two-dimensional information and the three-dimensional information of the to-be-decoded patch may be parsed from the bitstream in the differential decoding scheme, and the rotation transformation information and the normal coordinate axis information of the to-be-decoded patch are parsed from the bitstream in the fixed-length decoding scheme. For the non-first third-type patch, a manner of parsing the two-dimensional information and the three-dimensional information of the to-be-decoded patch from the bitstream in the differential decoding scheme is: parsing a difference between the two-dimensional information of the to-be-decoded patch and the two-dimensional information of the first third-type patch from the bitstream, and adding the difference to the two-dimensional information of the first third-type patch to obtain the two-dimensional information of the to-be-decoded patch; and parsing a difference between the three-dimensional information of the to-be-decoded patch and the three-dimensional information of the first third-type patch from the bitstream, and adding the difference to the three-dimensional information of the first third-type patch to obtain the three-dimensional information of the to-be-decoded patch.

S1105. Reconstruct the to-be-decoded patch based on the auxiliary information of the to-be-decoded patch.

It should be noted that after the auxiliary information of the to-be-decoded patch is obtained, in other words, after the two-dimensional information, the three-dimensional information, the rotation transformation information, and the normal coordinate axis information of the to-be-decoded patch are obtained, the to-be-decoded patch may be reconstructed based on but not limited to such auxiliary information. This application sets no limitation on specific information required for reconstructing the to-be-decoded patch.

In this embodiment of this application, when the first index is the first value, it indicates that the to-be-decoded patch is a first-type patch. In this case, the auxiliary information of the to-be-decoded patch may be parsed from the bitstream, and the auxiliary information includes the three-dimensional information of the to-be-decoded patch. When the first index is the second value, it indicates that the to-be-decoded patch is a second-type patch. In this case, the auxiliary information of the to-be-decoded patch may be parsed from the bitstream, where the auxiliary information includes the two-dimensional information and the three-dimensional information of the to-be-decoded patch, and the index information of the reference patch of the to-be-decoded patch. When the first index is the third value, it indicates that the to-be-decoded patch is a third-type patch. In this case, the auxiliary information of the to-be-decoded patch may be parsed from the bitstream, where the auxiliary information includes the two-dimensional information, the three-dimensional information, the rotation transformation information, and the normal coordinate axis information of the to-be-decoded patch. In other words, for the first-type patch and the second-type patch, only a portion of auxiliary information needs to be parsed from the bitstream, and other auxiliary information may be derived or obtained. This can simplify a format of parsing the bitstream, reduce bit overheads of the bitstream, and improve decoding efficiency. In addition, in this embodiment of this application, different types of patches may be indicated by using values of the first index, in other words, the first-type patch, the second-type patch, and the third-type patch may be distinguished. In this way, a quantity of first-type patches does not need to be parsed from the bitstream, the bit overheads of the bitstream are further reduced, and the decoding efficiency is improved.

The following describes a second point cloud encoding method provided in an embodiment of this application. It should be noted that, with reference to the point cloud coding system shown in FIG. 1 and the schematic block diagram of the encoder 100 shown in FIG. 2, any point cloud encoding method in the following may be performed by the encoder 100 in the point cloud coding system, and more specifically, may be performed by the auxiliary information encoding module 109 in the encoder 100.

Figure 12:
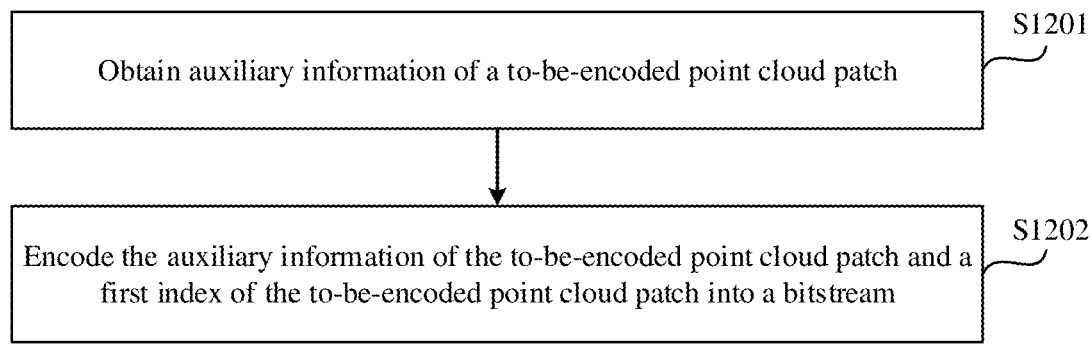
FIG. 12 is a flowchart of a second point cloud encoding method according to an embodiment of this application.

Referring to FIG. 12, the method includes the following steps.

S1201. Obtain auxiliary information of a to-be-encoded patch.

It should be noted that details for S1201, refer to the above disclosure with respect to S1101 in the foregoing embodiment shown in FIG. 11.

S1202. Encode the auxiliary information of the to-be-encoded patch and a first index of the to-be-encoded patch into a bitstream.

Generally, a patch that has a matching relationship with a first-type patch exists in all point clouds in a current point cloud group, and two-dimensional information, rotation transformation information, and normal coordinate axis information of first-type patches in the current point cloud group are the same, but three-dimensional information thereof may be different. However, in some cases, the three-dimensional information of the first-type patches may alternatively be the same. In this case, when the first index is a first value, it may indicate that the to-be-encoded patch is a first-type patch, and information encoded into the bitstream may further include a second index.

It should be noted that the second index is used to indicate whether three-dimensional information of the to-be-encoded patch is encoded into the bitstream. A syntax element of the second index may be override_3d_shift_data_flag, in other words, override_3d_shift_data_flag may be referred to as a third syntax element. When the second index is a fourth value, it may indicate that the three-dimensional information of the to-be-encoded patch is not encoded into the bitstream.

In other words, the three-dimensional information of the to-be-encoded patch is the same as three-dimensional information of a reference patch of the to-be-encoded patch. Therefore, the three-dimensional information of the to-be-encoded patch may not need to be encoded into the bitstream again, in other words, the auxiliary information of the to-be-encoded patch may not include the three-dimensional information. When the second index is a fifth value, it may indicate that the three-dimensional information of the to-be-encoded patch is encoded into the bitstream. In other words, the three-dimensional information of the to-be-encoded patch is different from the three-dimensional information of the reference patch of the to-be-encoded patch. Therefore, the three-dimensional information of the to-be-encoded patch needs to be encoded into the bitstream, in other words, the auxiliary information of the to-be-encoded patch may include the three-dimensional information. A specific encoding method is not limited herein. For example, a differential encoding scheme may be used, or a fixed-length encoding scheme may be used. A syntax element of the fourth value may be false, and a syntax element of the fifth value may be true.

For example, in this specification, when the first index of the to-be-encoded patch is the first value, and the information encoded into the bitstream includes the second index, partial syntax structures are shown in Table 1 and Table 3.

the information encoded into the bitstream may further include a third index used to indicate whether the two-dimensional information of the to-be-encoded patch is encoded into the bitstream. A syntax element of the third index may be override_2d_shift_data_flag, in other words, override_2d_shift_data_flag may be referred to as a second syntax element. The second index has been described above.

When the third index is a sixth value, it may indicate that the two-dimensional information of the to-be-encoded patch is not encoded into the bitstream. In other words, the two-dimensional information of the to-be-encoded patch is the same as the two-dimensional information of the reference patch of the to-be-encoded patch. Therefore, the two-dimensional information of the to-be-encoded patch may not need to be encoded into the bitstream again, in other words, the auxiliary information of the to-be-encoded patch may not include the two-dimensional information. When the third index is a seventh value, it may indicate that the two-dimensional information of the to-be-encoded patch is encoded into the bitstream. In other words, the two-dimensional information of the to-be-encoded patch is different from the two-dimensional information of the reference patch of the to-be-encoded patch. Therefore, the two-dimensional information of the to-be-encoded patch needs to be encoded into the bitstream, in other words, the auxiliary information of the to-be-encoded patch may include the two-dimensional

TABLE 3

| skip_patch_data_unit( frmIdx, patchIndex ) { | Descriptor |
|---|---|
| spdu_override_3d_shift_data_flag [ frmIdx ][ patchIndex ] | ae(v) |
| if (spdu_override_3d_shift_data_flag [ frmIdx ][ patchIndex ]){ | |
|    spdu_3d_shift_tangent_axis[ frmIdx ][ patchIndex ] | ae(v) |
|    spdu_3d_shift_bitangent_axis[ frmIdx ][ patchIndex ] | ae(v) |
|    spdu_3d_shift_normal_axis[ frmIdx ][ patchIndex ] | ae(v) |
| } | |
| projectionFlag = 0 | |
| i = 0 | |
| while (i < sps_layer_count_minus1 + 1 && projectionFlag = = 0 ) | |
| { | |
|    projectionFlag = projectionFlag \| sps_layer_absolute_coding_enabled_flag[ i ] | |
|    i++ | |
| } | |
| if ( projectionFlag ) | |
|    spdu_projection_mode[ frmIdx ][ patchIndex ] | ae(v) |
| } | |

Further, in a possible case, when the first index of the to-be-encoded patch is the first value, in other words, when the to-be-encoded patch is a first-type patch, the three-dimensional information of the to-be-encoded patch is different from the three-dimensional information of the reference patch, and the two-dimensional information of the to-be-encoded patch is different from two-dimensional information of the reference patch. In this case, when the first index is the first value, in addition to the second index, information. A syntax element of the sixth value may be false, and a syntax element of the seventh value may be true.

For example, in this specification, when the first index of the to-be-encoded patch is the first value, and the information encoded into the bitstream includes the second index and the third index, partial syntax structures are shown in Table 1 and Table 4.

TABLE 4

| skip_patch_data_unit( frmIdx, patchIndex ) { | Descriptor |
|---|---|
| spdu_override_3d_shift_data_flag [ frmIdx ][ patchIndex ] | ae(v) |
| if (spdu_override_3d_shift_data_flag [ frmIdx ][ patchIndex ]){ | |
|    spdu_3d_shift_tangent_axis[ frmIdx ][ patchIndex ] | ae(v) |
|    spdu_3d_shift_bitangent_axis[ frmIdx ][ patchIndex ] | ae(v) |
|    spdu_3d_shift_normal_axis[ frmIdx ][ patchIndex ] | ae(v) |
| } | |
| spdu_override_2d_shift_data_flag [ frmIdx ][ patchIndex ] | ae(v) |
| if (spdu_override_2d_shift_data_flag [ frmIdx ][ patchIndex ]){ | |

TABLE 4-continued

```
skip_patch_data_unit( frmIdx, patchIndex ) {                              Descriptor
    dpdu_2d_shift_u[ frmIdx ][ patchIndex ]                               ae(v)
    dpdu_2d_shift_v[ frmIdx ][ patchIndex ]                               ae(v)
    dpdu_2d_delta_size_u[ frmIdx ][ patchIndex ]                          ae(v)
    dpdu_2d_delta_size_v[ frmIdx ][ patchIndex ]                          ae(v)
 }
 projectionFlag = 0
 i = 0
 while (i < sps_layer_count_minus1 + 1 && projectionFlag = = 0
)
{
    projectionFlag = projectionFlag |
sps_layer_absolute_coding_enabled_flag[ i ]
    i++
 }
 if ( projectionFlag )
    spdu_projection_mode[ frmIdx ][ patchIndex ]                          ae(v)
 }
```

When the three-dimensional information of the to-be-encoded patch is different from the three-dimensional information of the reference patch, and the two-dimensional information of the to-be-encoded patch is different from the two-dimensional information of the reference patch, not only the second index and the third index may be used to indicate whether the information encoded into the bitstream includes the two-dimensional information and the three-dimensional information of the to-be-decoded patch, but also another manner may be used. For example, a fourth index may further be used to indicate whether the two-dimensional information and the three-dimensional information of the to-be-encoded patch are both encoded into the bitstream. In other words, when the first index is the first value, it may indicate that the to-be-encoded patch is a first-type patch, and the information encoded into the bitstream may further include the fourth index. A syntax element of the fourth index may be override_patch_data_flag. When the fourth index is an eighth value, it may indicate that the two-dimensional information and the three-dimensional information of the to-be-decoded patch are the same as the two-dimensional information and the three-dimensional information of the reference patch of the to-be-decoded patch, and are not encoded into the bitstream. When the fourth index is a ninth value, it may indicate that the two-dimensional information and the three-dimensional information of the to-be-decoded patch are different from the two-dimensional information and the three-dimensional information of the reference patch of the to-be-decoded patch, and are encoded into the bitstream. A syntax element of the eighth value may be false, and a syntax element of the ninth value may be true.

The three-dimensional information of the to-be-encoded patch may include a shift of the to-be-encoded patch in a 3D space along a tangent direction (3d_shift_tangent_axis), a shift of the to-be-encoded patch in the 3D space along a bitangent direction (3d_shift_bitangent_axis), and a shift of the to-be-encoded patch in the 3D space along a normal direction (3d_shift_normal_axis). The two-dimensional information of the to-be-encoded patch may include a shift of the to-be-encoded patch in an occupancy map of the current point cloud frame along a u-axis direction (2d_shift_u), a shift of the to-be-encoded patch in the occupancy map of the current point cloud frame along a v-axis direction (2d_shift_v), a width of the to-be-encoded patch in the occupancy map of the current point cloud frame (2d_size_u), and a height of the to-be-encoded patch in the occupancy map of the current point cloud frame (2d_size_v). Therefore, an index (override_3d_shift_tangent_axis) used to indicate whether 3d_shift_tangent_axis encoded into is the bitstream, an index (override_3d_shift_bitangent_axis) used to indicate whether 3d_shift_bitangent_axis is encoded into the bitstream, and an index (override_3d_shift_normal_axis) used to indicate whether 3d_shift_normal_axis is encoded into the bitstream may be further used to indicate whether the three-dimensional information of the to-be-decoded patch is encoded into the bitstream. In addition, an index (override_2d_shift_u) used to indicate whether 2d_shift_u is encoded into the bitstream, an index (override_2d_shift_v) used to indicate whether 2d_shift_v is encoded into the bitstream, an index (override_2d_size_u) used to indicate whether 2d_size_u is encoded into the bitstream, and an index (override_2d_size_v) used to indicate whether 2d_size_v is encoded into the bitstream are used to indicate whether the two-dimensional information of the to-be-decoded patch is encoded into the bitstream. Similar to the second index, the third index, and the fourth index, the foregoing indexes may each have two values, and syntax elements of the two values may be true and false. For a meaning of each value, refer to meanings of different values of the second index, the third index, or the fourth index.

For example, in this specification, when the first index of the to-be-encoded patch is the first value, and the information encoded into the bitstream includes the fourth index and indexes that are respectively used to indicate different two-dimensional information and three-dimensional information, partial syntax structures are shown in Table 1 and Table 5.

TABLE 5

```
skip_patch_data_unin frmIdx, patchIndex ) {                               Descriptor
    spdu_patch_index[ frmIdx ][ patchIndex ] // this is optional          ae(v)
    spdu_override_patch_data_flag[ frmIdx ][ patchIndex ]                 ae(v)
    if (spdu_override_patch_data_flag[ frmIdx ][ patchIndex ]) {
```

TABLE 5-continued

| skip_patch_data_unin frmIdx, patchIndex ) { | Descriptor |
|---|---|
| spdu_override_2d_shift_u[ frmIdx ][ patchIndex ] | ae(v) |
| if (spdu_override_2d_shift_u[ frmIdx ][ patchIndex ]) | |
| spdu_2d_shift_u[ frmIdx ][ patchIndex ] | ae(v) |
| spdu_override_2d_shift_v[ frmIdx ][ patchIndex ] | ae(v) |
| if (spdu_override_2d_shift_v[ frmIdx ][ patchIndex ]) | |
| spdu_2d_shift_v[ frmIdx ][ patchIndex ] | ae(v) |
| spdu_override_2d_delta_size_u[ frmIdx ][ patchIndex ] | ae(v) |
| if (spdu_override_2d_delta_size_u[ frmIdx ][ patchIndex ]) | |
| spdu_2d_delta_size_u[ frmIdx ][ patchIndex ] | ae(v) |
| spdu_override_2d_delta_size_v[ frmIdx ][ patchIndex ] | ae(v) |
| if (spdu_override_2d_delta_size_v[ frmIdx ][ patchIndex ]) | |
| spdu_2d_delta_size_v[ frmIdx ][ patchIndex ] | ae(v) |
| spdu_override_3d_shift_tangent_axis[ frmIdx ][ patchIndex ] | ae(v) |
| if (spdu_override_3d_shift_tangent_axis[ frmIdx ][ patchIndex ]) | |
| spdu_3d_shift_tangent_axis[ frmIdx ][ patchIndex ] | ae(v) |
| spdu_override_3d_shift_bitangent_axis[ frmIdx ][ patchIndex ] | |
| if (spdu_override_3d_shift_bitangent_axis[ frmIdx ][ patchIndex ]) | |
| spdu_3d_shift_bitangent_axis[ frmIdx ][ patchIndex ] | ae(v) |
| spdu_override_3d_shift_normal_axis[ frmIdx ][ patchIndex ] | ae(v) |
| if (spdu_override_3d_shift_normal_axis[ frmIdx ][ patchIndex ]) | |
| spdu_3d_shift_normal_axis[ frmIdx ][ patchIndex ] | ae(v) |
| } | |
| projectionFlag = 0 | |
| i = 0 | |
| while (i < sps_layer_count_minus1 + 1 && projectionFlag = = 0 ) { | |
| projectionFlag = projectionFlag \| sps_layer_absolute_coding_enabled_flag [ i ] | |
| i++ | |
| } | |
| if ( projectionFlag ) | |
| dpdu_projection_mode[ frmIdx ][ patchIndex ] | ae(v) |
| } | |

When the first index is the second value, it may indicate that the to-be-encoded patch is a second-type patch. In other words, a reference patch that matches the to-be-encoded patch exists in a reference frame of a current point cloud frame. The auxiliary information of the to-be-encoded patch includes the two-dimensional information, the three-dimensional information, and index information of the reference patch of the to-be-encoded patch.

When the first index is the third value, it may indicate that the to-be-encoded patch is a third-type patch. In other words, no reference patch that matches the to-be-encoded patch exists in the reference frame of the current point cloud frame. The auxiliary information of the to-be-encoded patch includes the two-dimensional information, the three-dimensional information, rotation transformation information, and normal coordinate axis information.

In this embodiment of this application, values of the first index may be the first value, the second value, and the third value. Different values indicate different types of patches. Therefore, different types of patches can be distinguished by using the first index. In this way, a quantity of first-type patches does not need to be written into the bitstream, and bit overheads of the bitstream are reduced. In addition, when the first index is the first value, the information encoded into the bitstream may further include the second index, so as to indicate whether the three-dimensional information of the to-be-encoded patch is encoded into the bitstream. When the second index is the fourth value, it indicates that the three-dimensional information of the to-be-encoded patch is not encoded into the bitstream. In other words, the three-dimensional information of the to-be-encoded patch is the same as the three-dimensional information of the reference patch of the to-be-encoded patch. Therefore, the three-dimensional information of the to-be-encoded patch may not need to be encoded into the bitstream again, in other words, the auxiliary information of the to-be-encoded patch may not include the three-dimensional information. In this way, bit overheads of the bitstream can be further reduced. In addition, for the first-type patch and the second-type patch, only a portion of auxiliary information is encoded into the bitstream. This can simplify a format of information encoded into the bitstream, reduce the bit overheads of the bitstream, and improve encoding efficiency.

Figure 13:
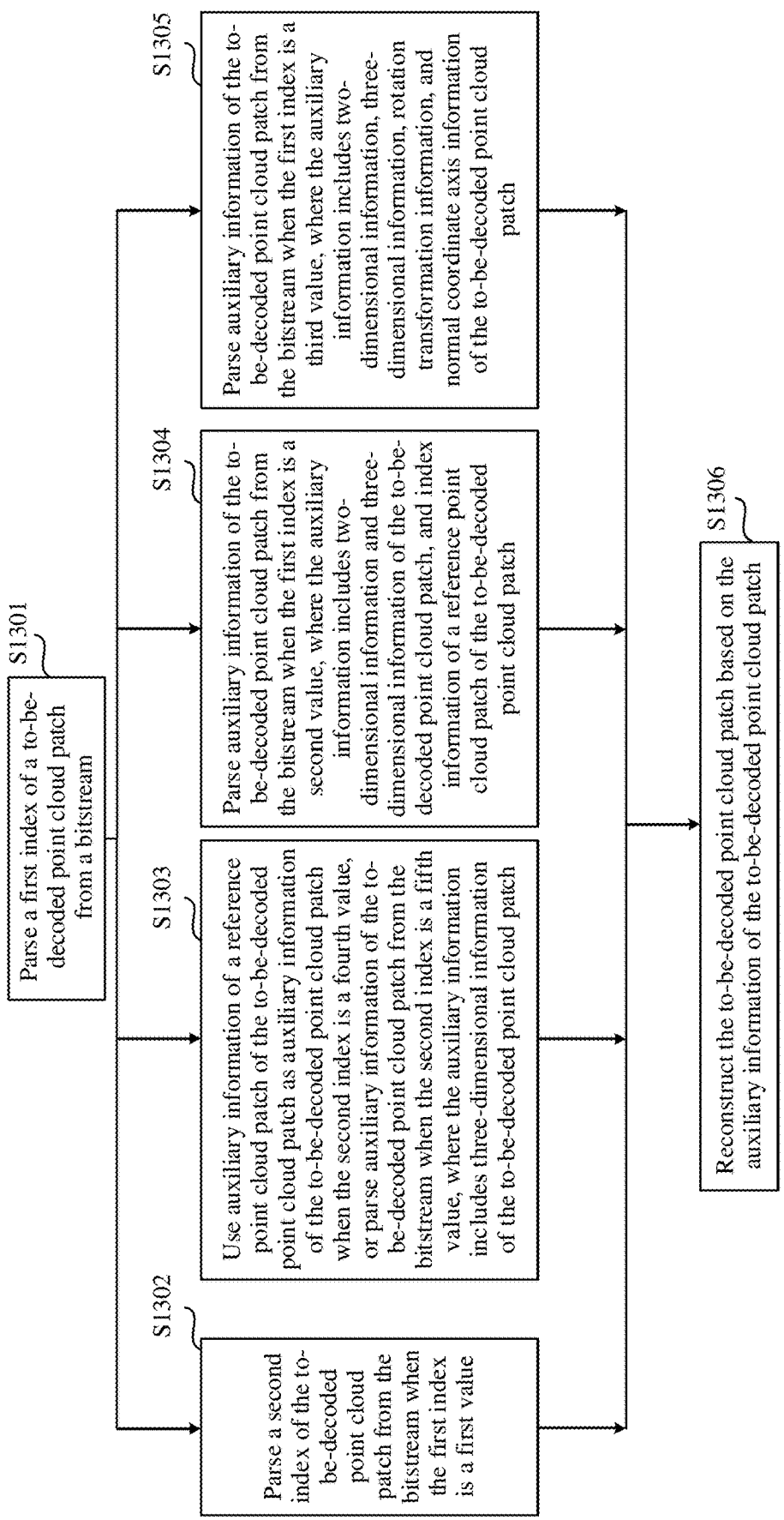
FIG. 13 is a flowchart of a second point cloud decoding method according to an embodiment of this application.

Next, a point cloud decoding method corresponding to the point cloud encoding method based on the embodiment shown in FIG. 12 is described. It should be noted that, with reference to the point cloud coding system shown in FIG. 1 and the schematic block diagram of the decoder 200 shown in FIG. 6, any point cloud decoding method in the following may be performed by the decoder 200 in the point cloud coding system, and more specifically, may be performed by the auxiliary information decoding module 204 in the decoder 200. Referring to FIG. 13, the decoding method includes the following steps.

S1301. Parse a first index of a to-be-decoded patch from a bitstream.

It should be noted that for detailed about S1301, refer to the above disclosure with respect to S1101.

S1302. Parse a second index of the to-be-decoded patch from the bitstream when the first index is a first value.

It should be noted that the second index is described above with respect to S1201.

S1303. Use auxiliary information of a reference patch of the to-be-decoded patch as auxiliary information of the to-be-decoded patch when the second index is a fourth value; or parse auxiliary information of the to-be-decoded patch from the bitstream when the second index is a fifth value, where the auxiliary information includes three-dimensional information of the to-be-decoded patch.

It should be noted that when the second index is the fourth value, it may indicate that the three-dimensional information of the to-be-decoded patch is not encoded into the bitstream. In other words, the three-dimensional information of the to-be-decoded patch is the same as three-dimensional information of the reference patch of the to-be-decoded patch. In this case, the auxiliary information of the reference patch of the to-be-decoded patch may be used as the auxiliary information of the to-be-decoded patch. When the second index is the fifth value, it may indicate that the three-dimensional information of the to-be-decoded patch is encoded into the bitstream, and the auxiliary information of the to-be-decoded patch includes the three-dimensional information. In this case, the auxiliary information of the to-be-decoded patch is parsed from the bitstream, and the auxiliary information includes the three-dimensional information of the to-be-decoded patch. For example, the auxiliary information of the to-be-decoded patch may be parsed from the bitstream in a differential decoding scheme. For a specific scheme, refer to the foregoing description.

In some embodiments, based on the description in step 1202, when the three-dimensional information of the to-be-encoded patch is different from the three-dimensional information of the reference patch, and the two-dimensional information of the to-be-encoded patch is different from the two-dimensional information of the reference patch, in addition to the second index, the information encoded into the bitstream may further include a third index used to indicate whether the two-dimensional information of the to-be-encoded patch is encoded into the bitstream. In other words, when the first index is the first value, in addition to parsing the second index of the to-be-decoded patch from the bitstream, the third index of the to-be-decoded patch may be further parsed from the bitstream. When the third index is a sixth value, it may indicate that the two-dimensional information of the to-be-encoded patch is not encoded into the bitstream. In other words, the two-dimensional information of the to-be-encoded patch is the same as the two-dimensional information of the reference patch of the to-be-encoded patch. Therefore, the two-dimensional information of the reference patch of the to-be-encoded patch may be used as the two-dimensional information of the to-be-encoded patch. When the third index is a seventh value, it may indicate that the two-dimensional information of the to-be-encoded patch is encoded into the bitstream. In other words, the two-dimensional information of the to-be-encoded patch is different from the two-dimensional information of the reference patch of the to-be-encoded patch. Therefore, the two-dimensional information of the to-be-decoded patch may be parsed from the bitstream. A specific decoding scheme may be a decoding method matching an encoding method.

In some other embodiments, based on the description in step 1202, when the three-dimensional information of the to-be-encoded patch is different from the three-dimensional information of the reference patch, and the two-dimensional information of the to-be-encoded patch is different from the two-dimensional information of the reference patch, not only the second index and the third index may be used to indicate whether the information encoded into the bitstream includes the two-dimensional information and the three-dimensional information of the to-be-decoded patch, but also another manner may be used. For example, a fourth index may further be used to indicate whether the two-dimensional information and the three-dimensional information of the to-be-encoded patch are both encoded into the bitstream. In other words, when the first index is the first value, the fourth index of the to-be-decoded patch may be parsed from the bitstream. When the fourth index is an eighth value, it may indicate that the two-dimensional information and the three-dimensional information of the to-be-decoded patch are the same as two-dimensional information and three-dimensional information of the reference patch of the to-be-decoded patch, and are not encoded into the bitstream. Therefore, the two-dimensional information and the three-dimensional information of the reference patch of the to-be-decoded patch may be used as the two-dimensional information and the three-dimensional information of the to-be-decoded patch. When the fourth index is a ninth value, it may indicate that the two-dimensional information and the three-dimensional information of the to-be-decoded patch are different from the two-dimensional information and the three-dimensional information of the reference patch of the to-be-decoded patch, and both are encoded into the bitstream. Therefore, the two-dimensional information and the three-dimensional information of the to-be-decoded patch may be parsed from the bitstream. A specific decoding scheme may be a decoding method matching the encoding method.

In addition, a manner of using an index (override_3d_shift_tangent_axis) used to indicate whether 3d_shift_tangent_axis is encoded into the bitstream, an index (override_3d_shift_bitangent_axis) used to indicate whether 3d_shift_bitangent_axis is encoded into the bitstream, and an index (override_3d_shift_normal_axis) used to indicate whether 3d_shift_normal_axis is encoded into the bitstream to indicate whether the three-dimensional information of the to-be-decoded patch is encoded into the bitstream and a manner of using an index (override_2d_shift_u) used to indicate whether 2d_shift_u is encoded into the bitstream, an index (override_2d_shift_v) used to indicate whether 2d_shift_v is encoded into the bitstream, an index (override_2d_size_u) used to indicate whether 2d_size_u is encoded into the bitstream, and an index (override_2d_size_v) used to indicate whether 2d_size_v is encoded into the bitstream to indicate whether the two-dimensional information of the to-be-decoded patch is encoded into the bitstream are similar to those for the second index, the third index, and the fourth index.

S1304. Parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch.

It should be noted that for detailed about S1304, refer to the above disclosure with respect to S1103.

S1305. Parse auxiliary information of the to-be-decoded patch from the bitstream when the first index is a third value, where the auxiliary information includes two-dimensional information, three-dimensional information, rotation transformation information, and normal coordinate axis information of the to-be-decoded patch.

It should be noted that for detailed about S1305, refer to the above disclosure with respect to S1104.

S1306. Reconstruct the to-be-decoded patch based on the auxiliary information of the to-be-decoded patch.

It should be noted that for detailed about S1306, refer to the above disclosure with respect to S1105.

In this embodiment of this application, values of the first index may be the first value, the second value, and the third value. Different values indicate different types of patches. Therefore, different types of patches can be distinguished by using the first index. In this way, a quantity of first-type patches does not need to be parsed from the bitstream, and bit overheads of the bitstream are reduced. In addition, when the first index is the first value, the second index of the to-be-decoded patch is parsed from the bitstream. When the second index is the fourth value, it indicates that three-dimensional information of the to-be-decoded patch is not encoded into the bitstream. In other words, the three-dimensional information of the to-be-decoded patch is the same as the three-dimensional information of the reference patch of the to-be-decoded patch. In this case, the three-dimensional information of the reference patch of the to-be-decoded patch may be used as the three-dimensional information of the to-be-decoded patch, and the three-dimensional information of the to-be-decoded patch does not need to be parsed from the bitstream. Therefore, this can simplify a format of parsing the bitstream, reduce bit overheads of the bitstream, and improve decoding efficiency.

Figure 14:
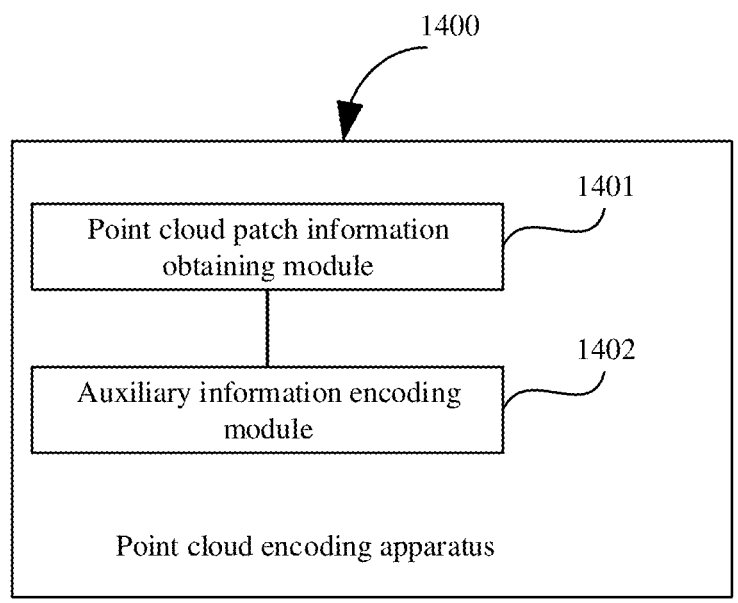
FIG. 14 is a schematic block diagram of a first encoding apparatus according to an embodiment of this application.

FIG. 14 is a schematic structural diagram of a first point cloud encoding apparatus according to an embodiment of this application. As shown in FIG. 14, an encoding apparatus 1400 may include:

- a point cloud patch information obtaining module 1401, configured to obtain auxiliary information of a to-be-encoded patch; and
- an auxiliary information encoding module 1402, configured to encode the auxiliary information of the to-be-encoded patch and a first index of the to-be-encoded patch into a bitstream, where
- the first index is a first value, indicating that the to-be-encoded patch is a first-type patch, and the auxiliary information of the to-be-encoded patch includes three-dimensional information; or
- the first index is a second value, indicating that the to-be-encoded patch is a second-type patch, and the auxiliary information of the to-be-encoded patch includes two-dimensional information, three-dimensional information, and index information of a reference patch of the to-be-encoded patch; or
- the first index is a third value, indicating that the to-be-encoded patch is a third-type patch, and the auxiliary information of the to-be-encoded patch includes two-dimensional information, three-dimensional information, rotation transformation information, and normal coordinate axis information.

The first value, the second value, and the third value are binary numbers 10, 11, and 00 respectively, or the first value, the second value, and the third value are binary numbers 11, 10, and 00 respectively.

When the first index of the to-be-encoded patch is the third value, the to-be-encoded patch is the first patch in a current point cloud frame.

The reference patch of the to-be-encoded patch is included in a reference frame of the current point cloud frame.

The first-type patch is a global matched patch in a current group, the second-type patch is a local matched patch in the current group, and the third-type patch is an unmatched patch in the current group.

It should be noted that the patch information obtaining module 1401 is configured to execute related content of step S901 in the embodiment shown in FIG. 9, and the auxiliary information encoding module 1402 is configured to execute related content of step S902 in the embodiment shown in FIG. 9. In an example, the patch information obtaining module 1401 may correspond to a combination of the point cloud patch information generation module 101 and the packing module 102 in FIG. 2, and the auxiliary information encoding module 1402 may correspond to the auxiliary information encoding module 109 in FIG. 2. In other words, a function of the patch information obtaining module 1401 may be implemented by the point cloud patch information generation module 101 and the packing module 102 in FIG. 2, and a function of the auxiliary information encoding module 1402 may be implemented by the auxiliary information encoding module 109 in FIG. 2. In an example, the point cloud patch information generation module 101 is configured to obtain the three-dimensional information, the normal coordinate axis information, the first index, and the like of the to-be-encoded patch. The packing module 102 is configured to obtain the rotation transformation information of the to-be-encoded patch, the index information of the reference patch, the two-dimensional information, and the like. Certainly, embodiments of the present disclosure are not limited thereto. For other details, refer to a conventional technology or the foregoing explanation of the principle of the encoder shown in FIG. 2.

Figure 15:
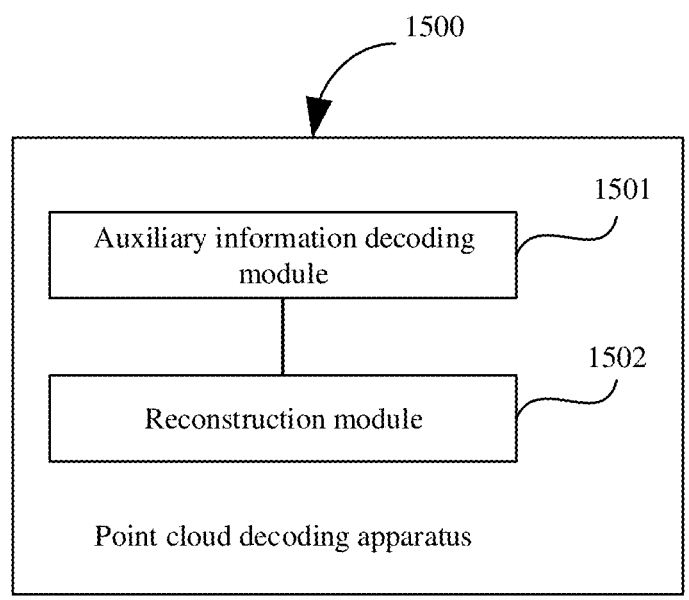
FIG. 15 is a schematic block diagram of a first decoding apparatus according to an embodiment of this application.

FIG. 15 is a schematic structural diagram of a first point cloud decoding apparatus according to an embodiment of this application. As shown in FIG. 15, the decoding apparatus 1500 may include:

- an auxiliary information decoding module 1501, configured to parse a first index of a to-be-decoded patch from a bitstream, where
- the auxiliary information decoding module 1501 is further configured to: parse auxiliary information of the to-be-decoded patch from the bitstream when the first index is a first value, where the auxiliary information includes three-dimensional information of the to-be-decoded patch; or parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parse auxiliary information of the to-be-decoded patch from the bitstream when the first index is a third value, where the auxiliary information includes two-dimensional information, three-dimensional information, rotation transformation information, and normal coordinate axis information of the to-be-decoded patch; and
- a reconstruction module 1502, configured to reconstruct the to-be-decoded patch based on the auxiliary information of the to-be-decoded patch.

The first value, the second value, and the third value are binary numbers 10, 11, and 00 respectively, or the first value, the second value, and the third value are binary numbers 11, 10, and 00 respectively.

The auxiliary information decoding module 1501 is further configured to:

- when the to-be-decoded patch is the first patch, and the first index is the third value, determine that a current point cloud frame to which the to-be-decoded patch belongs is the first point cloud frame.

The auxiliary information decoding module 1501 is further configured to:

- parse the first index of the to-be-decoded patch from the bitstream when the to-be-decoded patch is the first patch in the current point cloud frame; or parse a plurality of first indexes of a plurality of patches included in the current point cloud frame from the bitstream when the to-be-decoded patch is the first patch in the current point cloud frame, where the plurality of parsed first indexes include the first index of the to-be-decoded patch.

When the first index is the first value, the auxiliary information decoding module 1501 is further configured to:
obtain the two-dimensional information, the rotation transformation information, and the normal coordinate axis information of the to-be-decoded patch based on auxiliary information of the reference patch of the to-be-decoded patch; and
the reconstruction module 1502 is further configured to:
reconstruct the to-be-decoded patch based on the two-dimensional information, the three-dimensional information, the normal coordinate axis information, and the rotation transformation information of the to-be-decoded patch.

When the first index is the second value, the auxiliary information decoding module 1501 is further configured to:
obtain the rotation transformation information and the normal coordinate axis information of the to-be-decoded patch based on the index information of the reference patch of the to-be-decoded patch; and
the reconstruction module 1502 is further configured to:
reconstruct the to-be-decoded patch based on the two-dimensional information, the three-dimensional information, the normal coordinate axis information, and the rotation transformation information of the to-be-decoded patch.

The reference patch of the to-be-decoded patch is included in a reference frame of the current point cloud frame.

It should be noted that the auxiliary information decoding module 1501 is configured to execute related content of steps S1101 to S1104 in the embodiment shown in FIG. 11, and the reconstruction module 1502 is configured to execute related content of step S1105 in the embodiment shown in FIG. 11. As an example, the auxiliary information decoding module 1501 in FIG. 15 corresponds to the auxiliary information decoding module 204 in FIG. 6, and the reconstruction module 1502 in FIG. 15 corresponds to the point cloud geometry information reconstruction module 206 in FIG. 6. In other words, a function of the auxiliary information decoding module 1501 may be implemented by the auxiliary information decoding module 204 in FIG. 6, and a function of the reconstruction module 1502 may be implemented by the point cloud geometry information reconstruction module 206 in FIG. 6. Certainly, embodiments of the present disclosure are not limited thereto. For other details, refer to a conventional technology or the foregoing explanation of the principle of the decoder shown in FIG. 6.

Figure 16:
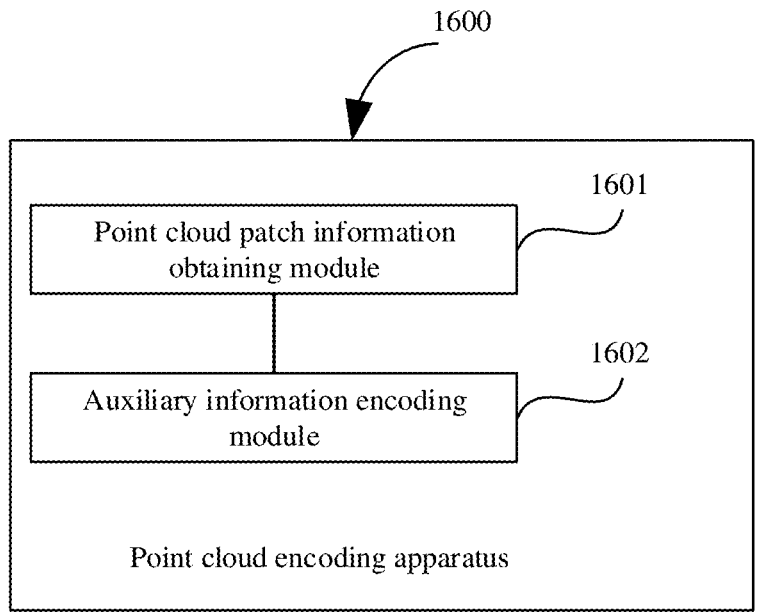
FIG. 16 is a schematic block diagram of a second encoding apparatus according to an embodiment of this application.

FIG. 16 is a schematic structural diagram of a second point cloud encoding apparatus according to an embodiment of this application. As shown in FIG. 16, the encoding apparatus 1600 may include:
a point cloud patch information obtaining module 1601, configured to obtain auxiliary information of a to-be-encoded patch; and
an auxiliary information encoding module 1602, configured to encode the auxiliary information of the to-be-encoded patch and a first index of the to-be-encoded patch into a bitstream, where
the first index is a first value, indicating that the to-be-encoded patch is a first-type patch, and information encoded into the bitstream further includes a second index, where the second index is a fourth value, indicating that three-dimensional information of the to-be-encoded patch is not encoded into the bitstream, or the second index is a fifth value, indicating that three-dimensional information of the to-be-encoded patch is encoded into the bitstream, and the auxiliary information of the to-be-encoded patch includes the three-dimensional information; or
the first index is a second value, indicating that the to-be-encoded patch is a second-type patch, and the auxiliary information of the to-be-encoded patch includes two-dimensional information, three-dimensional information, and index information of a reference patch of the to-be-encoded patch; or
the first index is a third value, indicating that the to-be-encoded patch is a third-type patch, and the auxiliary information of the to-be-encoded patch includes two-dimensional information, three-dimensional information, rotation transformation information, and normal coordinate axis information.

It should be noted that the patch information obtaining module 1601 is configured to execute related content of step S1201 in the embodiment shown in FIG. 12, and the auxiliary information encoding module 1602 is configured to execute related content of step S1202 in the embodiment shown in FIG. 12. In an example, the patch information obtaining module 1601 may correspond to a combination of the point cloud patch information generation module 101 and the packing module 102 in FIG. 2, and the auxiliary information encoding module 1602 may correspond to the auxiliary information encoding module 109 in FIG. 2. In other words, a function of the patch information obtaining module 1601 may be implemented by the point cloud patch information generation module 101 and the packing module 102 in FIG. 2, and a function of the auxiliary information encoding module 1602 may be implemented by the auxiliary information encoding module 109 in FIG. 2. In an example, the point cloud patch information generation module 101 is configured to obtain the three-dimensional information, the normal coordinate axis information, the first index, the second index, and the like of the to-be-encoded patch. The packing module 102 is configured to obtain the rotation transformation information of the to-be-encoded patch, the index information of the reference patch, the two-dimensional information, and the like. Certainly, embodiments of the present disclosure are not limited thereto. For other details, refer to a conventional technology or the foregoing explanation of the principle of the encoder shown in FIG. 2.

Figure 17:
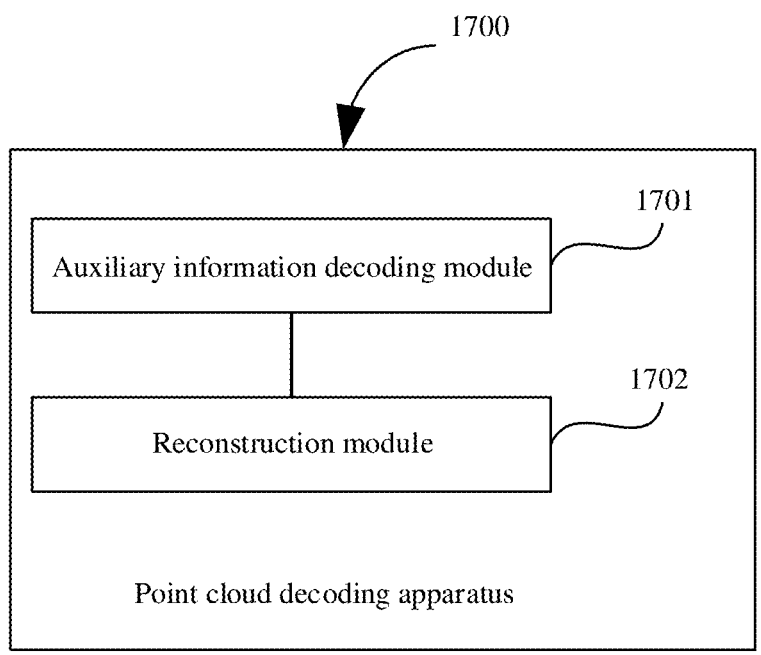
FIG. 17 is a schematic block diagram of a second decoding apparatus according to an embodiment of this application.

FIG. 17 is a schematic structural diagram of a second point cloud decoding apparatus according to an embodiment of this application. As shown in FIG. 17, the decoding apparatus 1700 may include:
an auxiliary information decoding module 1701, configured to parse a first index of a to-be-decoded patch from a bitstream, where
the auxiliary information decoding module 1701 is further configured to: parse a second index of the to-be-decoded patch from the bitstream when the first index is a first value, and use auxiliary information of a reference patch of the to-be-decoded patch as auxiliary information of the to-be-decoded patch when the second index is a fourth value or parse auxiliary information of the to-be-decoded patch from the bitstream when the second index is a fifth value, where the auxiliary information includes three-dimensional information of the to-be-decoded patch; or parse auxiliary information of the to-be-decoded patch from the bitstream when the first index is a second value, where the auxiliary information includes two-dimensional information and three-dimensional information of the to-be-decoded patch, and index information of a reference patch of the to-be-decoded patch; or parse auxiliary information of the to-be-decoded patch from the bitstream when the first index is a third value, where the auxiliary information includes two-dimensional information, three-dimensional information, rotation transformation information, and normal coordinate axis information of the to-be-decoded patch; and a reconstruction module 1702, configured to reconstruct the to-be-decoded patch based on the auxiliary information of the to-be-decoded patch.

It should be noted that the auxiliary information decoding module 1701 is configured to execute related content of steps S1301 to S1305 in the embodiment shown in FIG. 13, and the reconstruction module 1702 is configured to execute related content of step S1306 in the embodiment shown in FIG. 13. As an example, the auxiliary information decoding module 1701 in FIG. 17 corresponds to the auxiliary information decoding module 204 in FIG. 6, and the reconstruction module 1702 in FIG. 17 corresponds to the point cloud geometry information reconstruction module 206 in FIG. 6. In other words, a function of the auxiliary information decoding module 1701 may be implemented by the auxiliary information decoding module 204 in FIG. 6, and a function of the reconstruction module 1702 may be implemented by the point cloud geometry information reconstruction module 206 in FIG. 6. Certainly, embodiments of the present disclosure are not limited thereto. For other details, refer to a conventional technology or the foregoing explanation of the principle of the decoder shown in FIG. 6.

Figure 18:
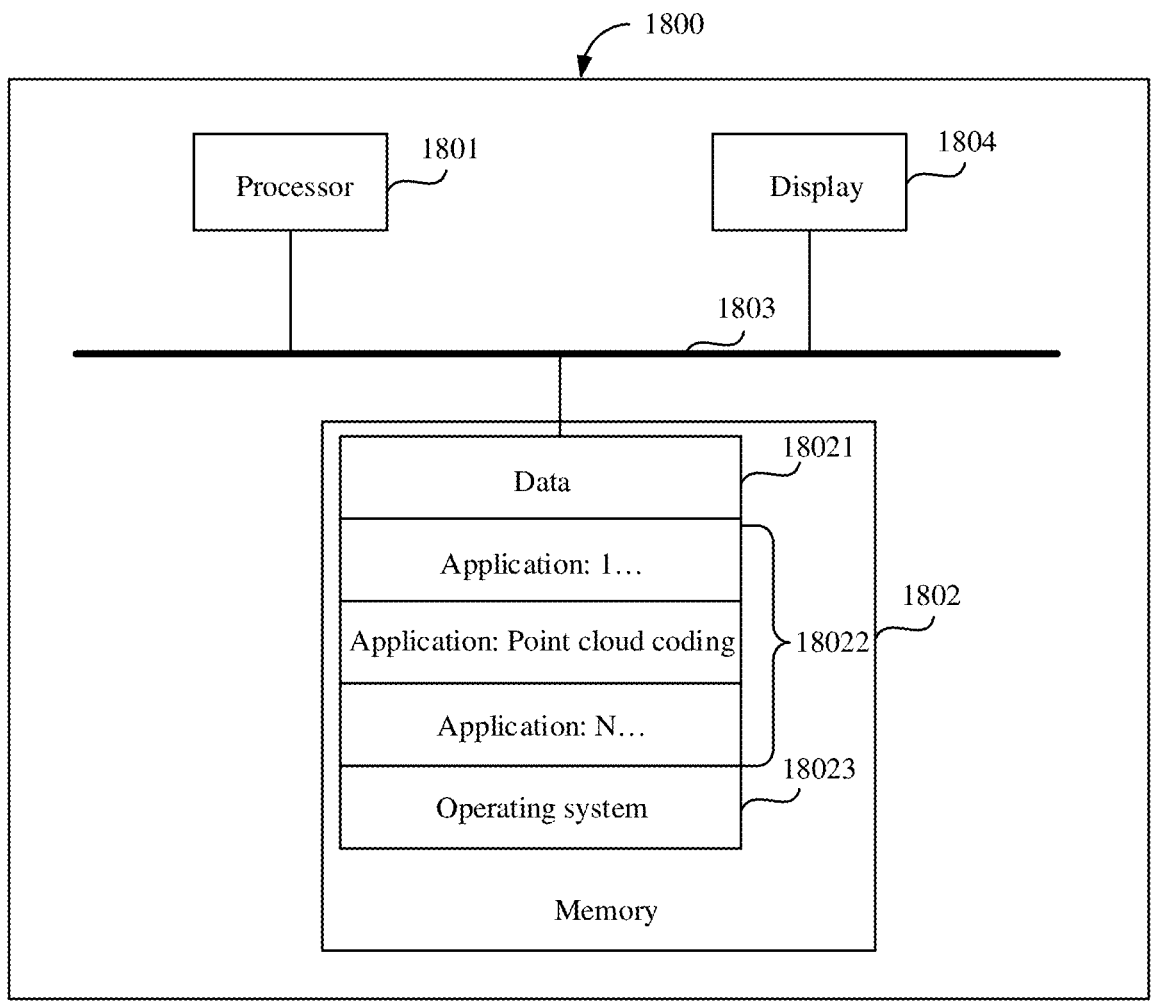
FIG. 18 is a schematic block diagram of an implementation of a coding device according to an embodiment of this application.

FIG. 18 is a schematic block diagram of an implementation of a coding apparatus 1800 according to an embodiment of this application. The coding apparatus 1800 may include a processor 1801, a memory 1802, and a bus system 1803. The processor 1801 is connected to the memory 1802 by using the bus system 1803, the memory 1802 is configured to store instructions, and the processor 1801 is configured to execute the instructions stored in the memory 1802, so as to perform various point cloud encoding or decoding methods described in this application.

In this embodiment of this application, the processor 1801 may be a central processing unit (CPU), or the processor 1801 may be another general-purpose processor, a DSP, an ASIC, an FPGA or another programmable logic device, a discrete gate or a transistor logic device, a discrete hardware component, or the like. The general purpose processor may be a microprocessor, or the processor may be any conventional processor or the like.

The memory 1802 may include a ROM device or a RAM device. Any another suitable type of storage device may also be used as the memory 1802. The memory 1802 may include code and data 18021 accessed by the processor 1801 by using the bus system 1803. The memory 1802 may further include an operating system 18023 and an application program 18022. The application program 18022 includes at least one program that allows the processor 1801 to perform the point cloud encoding or decoding method described in this application (in particular, the point cloud codec method described in this application). For example, the application program 18022 may include applications 1 to N, which further include a point cloud encoding or decoding application (referred to as a point cloud coding application) performing the point cloud encoding or decoding method described in this application.

The bus system 1803 may further include a power bus, a control bus, a status signal bus, and the like, in addition to a data bus. However, for clear description, various types of buses in the figure are marked as the bus system 1803.

Optionally, the coding apparatus 1800 may further include one or more output devices, such as a display 1804. In an example, the display 1804 may be a touch-sensitive display that combines the display with a touch-sensitive unit operable to sense a touch input. The display 1804 may be connected to the processor 1801 by using the bus 1803.

It should be noted that the coding apparatus 1800 may perform the point cloud encoding method in this application, or may perform the point cloud decoding method in this application.

A person skilled in the art can appreciate that functions described with reference to various illustrative logical blocks, modules, and algorithm steps disclosed in this specification may be implemented by hardware, software, firmware, or any combination thereof. If the functions are implemented by software, the functions described in various illustrative logical blocks, modules, and steps may be stored in or transmitted by a computer readable medium as one or more instructions or code, and executed by a hardware-based processing unit. The computer readable medium may include a computer readable storage medium. The computer readable storage medium corresponds to a tangible medium such as a data storage medium, or a communication medium including any medium that facilitates transmission of a computer program from a place to another place (for example, according to a communication protocol). In this manner, the computer readable medium may be generally corresponding to: (1) a non-transitory tangible computer readable storage medium, or (2) a communications medium such as a signal or a carrier. The data storage medium may be any available medium that may be accessed by one or more computers or one or more processors to retrieve instructions, code, and/or data structures used to implement the technologies described in this application. A computer program product may include a computer readable medium.

By way of example and not limitation, such computer readable storage media may include a RAM, a ROM, an EEPROM, a CD-ROM, another optical disc storage device or magnetic disk storage device, another magnetic storage device, a flash memory, or any other medium that can store required program code in a form of an instruction or a data structure and can be accessed by a computer. In addition, any connection is appropriately referred to as a computer readable medium. For example, if an instruction is sent from a website, a server, or another remote source by using a coaxial cable, an optical cable, a twisted pair, a digital subscriber line (DSL), or a wireless technology (for example, infrared, radio, or microwave), the coaxial cable, the optical cable, the twisted pair, the DSL, or the wireless technology (for example, infrared, radio, or microwave) is included in a definition of a medium. However, it should be understood that the computer readable storage medium and the data storage medium may not include a connection, a carrier, a signal, or another transitory medium, but are actually directed to non-transitory tangible storage media. A disk and an optical disc used in this specification include a compact disc (CD), a laser disc, an optical disc, a DVD, and a Blu-ray disc, where the disk generally magnetically reproduces data, and the optical disc optically reproduces data by using a laser. A combination of the above shall further be included in the scope of the computer readable medium.

An instruction may be executed by one or more processors such as one or more digital signal processors (DSP), a general microprocessor, an application-specific integrated circuit (ASIC), a field programmable gate array (FPGA), or an equivalent integrated circuit or discrete logic circuits. Therefore, the term "processor" used in this specification may refer to the foregoing structure, or any other structure that may be applied to implementation of the technologies described in this specification. In addition, in some aspects, the functions described in this specification may be provided in a dedicated hardware and/or software module configured for encoding and decoding, or may be incorporated into a combined coder-decoder. In addition, the technologies may be completely implemented in one or more circuits or logic elements. In an example, various illustrative logic blocks, units, and modules in the encoder 100 and the decoder 200 may be understood as corresponding circuit devices or logic elements.

The technologies in this application may be implemented in various apparatuses or devices, including a wireless handset, an integrated circuit (IC), or a group of ICs (for example, a chipset). In this application, various components, modules, or units are described to emphasize functions of an apparatus configured to implement the disclosed technologies, but the functions do not need to be implemented by different hardware units. Actually, as described above, various units may be combined into a codec hardware unit, or may be provided by interoperable hardware units (including one or more processors described above) in combination with appropriate software and/or firmware.

The foregoing descriptions are merely example specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

The invention claimed is:

1. A point cloud encoding method, comprising:
   obtaining auxiliary information of a to-be-encoded patch of a point cloud; and
   encoding the auxiliary information of the to-be-encoded patch and a syntax element of the to-be-encoded patch into a bitstream, wherein the syntax element comprises a first syntax element, wherein,
   when the first syntax element indicates that the to-be-encoded patch has a reference patch, the encoding the auxiliary information of the to-be-encoded patch and a syntax element of the to-be-encoded patch into a bitstream comprises:
   encoding the auxiliary information and the syntax element of the to-be-encoded patch comprising the first syntax element and a second syntax element into the bitstream, wherein a value of the second syntax element being true indicates that two-dimensional information of the to-be-encoded patch is encoded into the bitstream but three-dimensional information of the to-be-encoded patch is not encoded into the bitstream, and the auxiliary information of the to-be-encoded patch comprises the two-dimensional information; or
   encoding the auxiliary information and the of the syntax element of the to-be-encoded patch comprising the first syntax element, a second syntax element and a third syntax element into the bitstream, wherein a value of the second syntax element being false and a value of the third syntax element being true indicate that two-dimensional information of the to-be-encoded patch is not encoded into the bitstream but three-dimensional information of the to-be-encoded patch is encoded into the bitstream, and the auxiliary information of the to-be-encoded patch comprises the three-dimensional information; or
   encoding the auxiliary information and the syntax element of the to-be-encoded patch comprising the first syntax element, a second syntax element and a third syntax element, wherein a value of the second syntax element being false and a value of the third syntax element being false indicate that two-dimensional information of the to-be-encoded patch is not encoded into the bitstream and three-dimensional information of the to-be-encoded patch is not encoded into the bitstream.

2. The point cloud encoding method according to claim 1, wherein, when the first syntax element indicates that the to-be-encoded patch does not have a reference patch, the auxiliary information of the to-be-encoded patch comprises the two-dimensional information, the three-dimensional information, rotation transformation information, and normal axis information.

3. The point cloud encoding method according to claim 1, wherein, when the first syntax element indicates that the to-be-encoded patch does not have a reference patch, and the to-be-encoded patch is a first patch in a current point cloud frame to which the to-be-encoded patch belongs, the current point cloud frame is a first point cloud frame.

4. The point cloud encoding method according to claim 1, wherein the reference patch of the to-be-encoded patch is comprised in a reference frame of a current point cloud frame.

5. The point cloud encoding method according to claim 4, wherein a location of the to-be-encoded patch in the current point cloud frame is the same as a location of the reference patch of the to-be-encoded patch in the reference frame of the current point cloud frame.

6. A point cloud decoding method, comprising:
   parsing a first syntax element of a to-be-decoded patch of a point cloud from a bitstream;
   parsing a second syntax element of the to-be-decoded patch from the bitstream or parsing the second syntax element and a third syntax element of the to-be-decoded patch from the bitstream, when the first syntax element indicates that the to-be-decoded patch has a reference patch;
   upon determination that a value of the second syntax element is true, parsing two-dimensional information of the to-be-decoded patch from the bitstream and obtaining three-dimensional information of the to-be-decoded patch based on three-dimensional information of the reference patch of the to-be-decoded patch, or
   upon determination that a value of the second syntax element is false and a value of the third syntax element is true, parsing three-dimensional information of the to-be-decoded patch from the bitstream and obtaining two-dimensional information of the to-be-decoded patch based on two-dimensional information of the reference patch of the to-be-decoded patch, or
   upon determination that a value of the second syntax element is false and a value of the third syntax element is false, obtaining two-dimensional information of the to-be-decoded patch based on two-dimensional information of the reference patch of the to-be-decoded patch and obtaining three-dimensional information of the to-be-decoded patch based on three-dimensional information of the reference patch of the to-be-decoded patch; and reconstructing the to-be-decoded patch based on auxiliary information of the to-be-decoded patch, wherein the auxiliary information of the to-be-decoded patch comprises the two-dimensional information of the to-be-decoded patch and the three-dimensional information of the to-be-decoded patch.

7. The point cloud decoding method according to claim 6, further comprising:
parsing the auxiliary information of the to-be-decoded patch from the bitstream when the first syntax element indicates that the to-be-decoded patch does not have a reference patch, wherein the auxiliary information of the to-be-decoded patch comprises the two-dimensional information, the three-dimensional information, rotation transformation information, and normal axis information.

8. The point cloud decoding method according to claim 6, further comprising:
when the to-be-decoded patch is a first patch and the first syntax element indicates that the to-be-decoded patch does not have a reference patch, determining that a current point cloud frame to which the to-be-decoded patch belongs is a first point cloud frame.

9. The point cloud decoding method according to claim 6, wherein the parsing a first syntax element of a to-be-decoded point cloud patch from a bitstream comprises:
parsing the first syntax element of the to-be-decoded patch from the bitstream when the to-be-decoded patch is a first patch in a current point cloud frame; or
parsing a plurality of first syntax elements of a plurality of patches comprised in the current point cloud frame from the bitstream when the to-be-decoded patch is a first patch in a current point cloud frame, wherein the plurality of parsed first syntax elements comprise the first syntax element of the to-be-decoded patch.

10. The point cloud decoding method according to claim 6, wherein the reference patch of the to-be-decoded patch is comprised in a reference frame of a current point cloud frame.

11. The point cloud decoding method according to claim 10, wherein a location of the to-be-decoded patch in the current point cloud frame is the same as a location of the reference patch of the to-be-decoded patch in the reference frame of the current point cloud frame.

12. A point cloud encoding apparatus, comprising:
one or more electronic circuits or processors configured to:
obtain auxiliary information of a to-be-encoded patch of a point cloud; and
encode the auxiliary information of the to-be-encoded patch and a syntax element of the to-be-encoded patch into a bitstream, wherein the syntax element comprises a first syntax element, wherein,
when the first syntax element indicates that the to-be-encoded patch has a reference patch, the encoding of the auxiliary information of the to-be-encoded patch and the syntax element of the to-be-encoded patch into the bitstream comprises:
encoding the auxiliary information and the syntax element of the to-be-coded patch comprising the first syntax element and a second syntax element into the bitstream, wherein a value of the second syntax element being true indicates that two-dimensional information of the to-be-encoded patch is encoded into the bitstream but three-dimensional information of the to-be-encoded patch is not encoded into the bitstream, and the auxiliary information of the to-be-encoded patch comprises the two-dimensional information; or
encoding the auxiliary information and the syntax element of the to-be-encoded patch comprising the first syntax element, a second syntax element and a third syntax element into the bitstream, wherein a value of the second syntax element being false and a value of the third syntax element being true indicate that two-dimensional information of the to-be-encoded patch is not encoded into the bitstream but three-dimensional information of the to-be-encoded patch is encoded into the bitstream, and the auxiliary information of the to-be-encoded patch comprises the three-dimensional information; or
encoding the auxiliary information and the tax element of the to-be-encoded patch comprising the first syntax element, a second syntax element and a third syntax element into the bitstream, wherein a value of the second syntax element being false and a value of the third syntax element being false indicate that two-dimensional information of the to-be-encoded patch is not encoded into the bitstream and three-dimensional information of the to-be-encoded patch is not encoded into the bitstream.

13. The point cloud encoding apparatus according to claim 12, wherein, when the first syntax element indicates that the to-be-encoded patch does not have a reference patch, the auxiliary information of the to-be-encoded patch comprises the two-dimensional information, the three-dimensional information, rotation transformation information, and normal axis information.

14. The point cloud encoding apparatus according to claim 12, wherein, when the first syntax element indicates that the to-be-encoded patch does not have a reference patch and the to-be-encoded patch is a first patch in a current point cloud frame to which the to-be-encoded patch belongs, the current point cloud frame is a first point cloud frame.

15. The point cloud encoding apparatus according to claim 12, wherein the reference patch of the to-be-encoded patch is comprised in a reference frame of a current point cloud frame.

16. The point cloud encoding apparatus according to claim 15, wherein a location of the to-be-encoded patch in the current point cloud frame is the same as a location of the reference patch of the to-be-encoded patch in the reference frame of the current point cloud frame.

17. A point cloud decoding apparatus, comprising:
one or more electronic circuits or processors configured to:
parse a first syntax element of a to-be-decoded patch of a point cloud from a bitstream;
parse a second syntax element of the to-be-decoded patch from the bitstream or parse the second syntax element and a third syntax element of the to-be-decoded patch from the bitstream, when the first syntax element indicates that the to-be-decoded patch has a reference patch;
upon determination that a value of the second syntax element is true, parse two-dimensional information of the to-be-decoded patch from the bitstream and obtain three-dimensional information of the to-be-decoded patch based on three-dimensional information of the reference patch of the to-be-decoded patch, or
upon determination that a value of the second syntax element is false and a value of the third syntax element is true, parse three-dimensional information of the to-be-decoded patch from the bitstream and obtain two-dimensional information of the to-be-decoded patch based on two-dimensional information of the reference patch of the to-be-decoded patch, or upon determination that a value of the second syntax element is false and a value of the third syntax element is false, obtain two-dimensional information of the to-be-decoded patch based on two-dimensional information of the reference patch of the to-be-decoded patch; and obtain three-dimensional information of the to-be-decoded patch based on three-dimensional information of the reference patch of the to-be-decoded patch; and reconstruct the to-be-decoded patch based on auxiliary information of the to-be-decoded patch, wherein the auxiliary information of the to-be-decoded patch comprises the two-dimensional information of the to-be-decoded patch and the three-dimensional information of the to-be-decoded patch.

18. The point cloud decoding apparatus according to claim 17, wherein the one or more electronic circuits or processors are further configured to:

parse the auxiliary information of the to-be-decoded patch from the bitstream when the first syntax element indicates that the to-be-decoded patch does not have a reference patch, wherein the auxiliary information of the to-be-decoded patch comprises the two-dimensional information, the three-dimensional information, rotation transformation information, and normal axis information.

19. The point cloud decoding apparatus according to claim 17, wherein the one or more electronic circuits or processors are further configured to:

when the to-be-decoded patch is a first patch, and the first syntax element indicates that the to-be-decoded patch does not have a reference patch, determine that a current point cloud frame to which the to-be-decoded patch belongs is a first point cloud frame.

20. The point cloud decoding apparatus according to claim 17, wherein the one or more electronic circuits or processors are further configured to:

parse the first syntax element of the to-be-decoded patch from the bitstream when the to-be-decoded patch is a first patch in a current point cloud frame; or parse a plurality of first syntax elements of a plurality of patches comprised in a current point cloud frame from the bitstream when the to-be-decoded patch is a first patch in the current point cloud frame, wherein the plurality of parsed first syntax elements comprise the first syntax element of the to-be-decoded patch.

21. The point cloud decoding apparatus according to claim 17, wherein the reference patch of the to-be-decoded patch is comprised in a reference frame of a current point cloud frame.

22. The point cloud decoding apparatus according to claim 21, wherein a location of the to-be-decoded patch in the current point cloud frame is the same as a location of the reference patch of the to-be-decoded patch in the reference frame of the current point cloud frame.

23. A non-transitory computer readable storage medium storing computer instructions, for performing a point cloud encoding method, that when executed by one or more processors, cause the one or more processors to perform operations comprising:

obtaining auxiliary information of a to-be-encoded patch of a point cloud; and encoding the auxiliary information of the to-be-encoded patch and a syntax element of the to-be-encoded patch into a bitstream, wherein the syntax element comprises a first syntax element, wherein:

when the first syntax element indicates that the to-be-encoded patch has a reference patch, the syntax element encoded into the bitstream further comprises a second syntax element, wherein a value of the second syntax element being true indicates that two-dimensional information of the to-be-encoded patch is encoded into the bitstream but three-dimensional information of the to-be-encoded patch is not encoded into the bitstream, and the auxiliary information of the to-be-encoded patch comprises the two-dimensional information; or the syntax element encoded into the bitstream further comprises a second syntax element and a third syntax element, wherein a value of the second syntax element being false and a value of the third syntax element being true indicate that two-dimensional information of the to-be-encoded patch is not encoded into the bitstream but three-dimensional information of the to-be-encoded patch is encoded into the bitstream, and the auxiliary information of the to-be-encoded patch comprises the three-dimensional information; or the syntax element encoded into the bitstream further comprises a second syntax element and a third syntax element, wherein a value of the second syntax element being false and a value of the third syntax element being false indicate that two-dimensional information of the to-be-encoded patch is not encoded into the bitstream and three-dimensional information of the to-be-encoded patch is not encoded into the bitstream.

24. A non-transitory computer readable storage medium storing computer instructions for performing a point cloud decoding method, that when executed by one or more processors, cause the one or more processors to perform operations comprising:

parsing a first syntax element of a to-be-decoded patch of a point cloud from a bitstream;

parsing a second syntax element of the to-be-decoded patch from the bitstream or parsing the second syntax element and a third syntax element of the to-be-decoded patch from the bitstream, when the first syntax element indicates that the to-be-decoded patch has a reference patch;

upon determination that a value of the second syntax element is true, parsing two-dimensional information of the to-be-decoded patch from the bitstream, and obtaining three-dimensional information of the to-be-decoded patch based on three-dimensional information of the reference patch of the to-be-decoded patch; or upon determination that a value of the second syntax element is false and a value of the third syntax element is true, parsing three-dimensional information of the to-be-decoded patch from the bitstream, and obtaining two-dimensional information of the to-be-decoded patch based on two-dimensional information of the reference patch of the to-be-decoded patch; or upon determination that a value of the second syntax element is false and a value of the third syntax element is false, obtaining two-dimensional information of the to-be-decoded patch based on two-dimensional information of the reference patch of the to-be-decoded patch, and obtaining three-dimensional information of the to-be-decoded patch based on three-dimensional information of the reference patch of the to-be-decoded patch; and reconstructing the to-be-decoded patch based on auxiliary information of the to-be-decoded patch, wherein the auxiliary information of the to-be-decoded patch comprises the two-dimensional information of the to-be-decoded patch and the three-dimensional information of the to-be-decoded patch.

* * * * *

UNITED STATES PATENT AND TRADEMARK OFFICE
CERTIFICATE OF CORRECTION

PATENT NO. : 12,212,762 B2
APPLICATION NO. : 17/477812
DATED : January 28, 2025
INVENTOR(S) : Kangying Cai It is certified that error appears in the above-identified patent and that said Letters Patent is hereby corrected as shown below:

In the Claims

Column 57, Claim 12, Line 61, change "to-be-coded" to --to-be-encoded--; and

Column 58, Claim 12, Line 15, change "tax" to --syntax--.

Signed and Sealed this
Twenty-fifth Day of February, 2025

Coke Morgan Stewart
*Acting Director of the United States Patent and Trademark Office*